(12) United States Patent
Damera-Venkata

(10) Patent No.: US 7,676,113 B2
(45) Date of Patent: Mar. 9, 2010

(54) GENERATING AND DISPLAYING SPATIALLY OFFSET SUB-FRAMES USING A SHARPENING FACTOR

(75) Inventor: Niranjan Damera-Venkata, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 907 days.

(21) Appl. No.: 10/992,926

(22) Filed: Nov. 19, 2004

(65) Prior Publication Data

US 2006/0110072 A1    May 25, 2006

(51) Int. Cl.
G06K 9/36 (2006.01)

(52) U.S. Cl. .................. 382/276; 348/571; 345/204

(58) Field of Classification Search ............... None
See application file for complete search history.

(56) References Cited

U.S. PATENT DOCUMENTS

| | | | |
|---|---|---|---|
| 4,373,784 A | | 2/1983 | Nonomura et al. |
| 4,662,746 A | | 5/1987 | Hornbeck |
| 4,811,003 A | | 3/1989 | Strathman et al. |
| 4,956,619 A | | 9/1990 | Hornbeck |
| 5,061,049 A | | 10/1991 | Hornbeck |
| 5,083,857 A | | 1/1992 | Hornbeck |
| 5,146,356 A | | 9/1992 | Carlson |
| 5,317,409 A | | 5/1994 | Macocs |
| 5,386,253 A | | 1/1995 | Fielding |
| 5,490,009 A | * | 2/1996 | Venkateswar et al. ....... 359/291 |
| 5,557,353 A | | 9/1996 | Stahl |
| 5,689,283 A | | 11/1997 | Shirochi |
| 5,912,773 A | | 6/1999 | Barnett et al. |
| 5,920,365 A | | 7/1999 | Eriksson |
| 5,953,148 A | | 9/1999 | Moseley et al. |
| 5,978,518 A | | 11/1999 | Oliyide et al. |
| 6,025,951 A | | 2/2000 | Swart et al. |
| 6,067,143 A | | 5/2000 | Tomita |
| 6,104,375 A | | 8/2000 | Lam |
| 6,118,584 A | | 9/2000 | Van Berkel et al. |
| 6,141,039 A | | 10/2000 | Poetsch |
| 6,184,969 B1 | | 2/2001 | Fergason |
| 6,219,017 B1 | * | 4/2001 | Shimada et al. ............... 345/88 |

(Continued)

FOREIGN PATENT DOCUMENTS

EP    1001306 A2    5/2000

(Continued)

OTHER PUBLICATIONS

"Unsharp Masking Based on the Multiscale Gradient Planes" Electronics and Communications in Japan vol. 87 Issue 4 pp. 40-54 Published online Dec. 16, 2003.*

(Continued)

*Primary Examiner*—Bhavesh M Mehta
*Assistant Examiner*—Sean Motsinger

(57) ABSTRACT

A method of displaying an image with a display device is provided. The method includes generating a first sub-frame and a second sub-frame corresponding to image data for the image including calculating a first sub-frame pixel value in the first sub-frame using a first sharpening factor associated with a first plurality of gradients from the image data, and alternating between displaying the first sub-frame in a first position and displaying the second sub-frame in a second position spatially offset from the first position.

20 Claims, 19 Drawing Sheets

U.S. PATENT DOCUMENTS

| | | | |
|---|---|---|---|
| 6,239,783 B1 | 5/2001 | Hill et al. | |
| 6,243,055 B1 | 6/2001 | Fergason | |
| 6,313,888 B1 | 11/2001 | Tabata | |
| 6,340,994 B1* | 1/2002 | Margulis et al. | 348/625 |
| 6,384,816 B1 | 5/2002 | Tabata | |
| 6,393,145 B2 | 5/2002 | Betrisey et al. | |
| 6,427,031 B1* | 7/2002 | Price | 382/264 |
| 6,456,340 B1* | 9/2002 | Margulis | 348/745 |
| 6,522,356 B1 | 2/2003 | Watanabe | |
| 6,657,603 B1 | 12/2003 | Demetrescu et al. | |
| 6,927,890 B2* | 8/2005 | Allen | 359/237 |
| 6,963,319 B2* | 11/2005 | Pate et al. | 345/30 |
| 7,003,177 B1* | 2/2006 | Mendlovic et al. | 382/299 |
| 7,030,894 B2* | 4/2006 | Allen et al. | 345/698 |
| 7,034,811 B2* | 4/2006 | Allen | 345/204 |
| 7,052,142 B2* | 5/2006 | Gupta | 353/46 |
| 7,106,914 B2* | 9/2006 | Tipping et al. | 382/299 |
| 7,109,981 B2* | 9/2006 | Damera-Venkata et al. | 345/204 |
| 7,154,508 B2* | 12/2006 | Childers | 345/589 |
| 7,190,380 B2* | 3/2007 | Damera-Venkata et al. | 345/698 |
| 7,218,751 B2* | 5/2007 | Reed et al. | 382/100 |
| 7,218,796 B2* | 5/2007 | Bishop et al. | 382/299 |
| 7,224,411 B2* | 5/2007 | Gibbon et al. | 348/757 |
| 7,239,428 B2* | 7/2007 | Solecki | 358/3.01 |
| 2003/0020809 A1 | 1/2003 | Gibbon et al. | |
| 2003/0076325 A1 | 4/2003 | Thrasher | |
| 2003/0090597 A1 | 5/2003 | Katoh et al. | |
| 2004/0027363 A1* | 2/2004 | Allen | 345/698 |
| 2005/0025388 A1* | 2/2005 | Damera-Venkata et al. | 382/300 |
| 2005/0068335 A1* | 3/2005 | Tretter et al. | 345/619 |
| 2005/0093894 A1* | 5/2005 | Tretter et al. | 345/694 |
| 2005/0093895 A1* | 5/2005 | Damera-Venkata | 345/698 |
| 2005/0110802 A1* | 5/2005 | Avinash | 345/629 |
| 2005/0147321 A1* | 7/2005 | Damera-Venkata et al. | 382/275 |
| 2005/0168493 A1* | 8/2005 | Damera-Venkata | 345/690 |
| 2005/0168494 A1* | 8/2005 | Damera-Venkata | 345/690 |
| 2005/0225568 A1* | 10/2005 | Collins | 345/635 |
| 2005/0225570 A1* | 10/2005 | Collins | 345/660 |
| 2005/0225571 A1* | 10/2005 | Collins et al. | 345/660 |
| 2005/0225732 A1* | 10/2005 | Conner et al. | 353/31 |
| 2005/0275642 A1* | 12/2005 | Aufranc et al. | 345/204 |
| 2005/0275669 A1* | 12/2005 | Collins et al. | 345/698 |
| 2005/0276517 A1* | 12/2005 | Collins et al. | 382/300 |
| 2006/0044294 A1* | 3/2006 | Damera-Venkata | 345/204 |
| 2006/0061604 A1* | 3/2006 | Ulichney et al. | 345/694 |
| 2006/0082561 A1* | 4/2006 | Allen et al. | 345/204 |
| 2006/0109286 A1* | 5/2006 | Damera-Venkata et al. | 345/690 |
| 2006/0110072 A1* | 5/2006 | Domera-Venkata | 382/299 |

FOREIGN PATENT DOCUMENTS

EP    1388838    2/2004

OTHER PUBLICATIONS

Polesel A et al—"Image Enhancement via Adaptive Unsharp Masking"—IEEE Transactions on Image Processing vol. 9 No. 3 Mar. 2000—pp. 505-510.

Jaynes C et al—"Super-Resolution Composition in Multi-Projector Display"—IEEE International Workshop on Projector-Camera System—Oct. 12, 2003.

Irani M et al—Improving Resolution by Image Registration—CVGIP Graphical Models and Image Processing—vol. 53 No. 3 May 1991—pp. 231-239.

Elad M et al—"Superresolution Restoration of an Image Sequence: Adaptive Filtering Approach"—IEEE Transactions on Image Processing vol. 8 No. 3 Mar. 1999—pp. 387-395.

Elad M et al—"Restoration of a Single Superresolution Image From Several Blurred, Noisy and Undersampled Measured Images"—IEEE Trans on Image Proc vol. 6 No. 12 Dec. 1997.

L.M. Chen and S. Hasagawa, "Visual Resolution Limits for Color Matrix Displays", "One Panel Projectors" Displays, Technologies, and Applications, vol. 13, pp. 221-226, 1992.

A. Yasuda et al., "FLC Wobbling for High-Resolution Projectors", Journal of the SID 5/3 1997, pp. 299-305.

T. Tokita et al., P-108: FLC Resolution-Enhancing Device for Projection Displays, SID 02 Digest 2002, pp. 638-641.

D.K. Kelley, "Motion and Vision—II. Stabilized Spatio-Temporal Threshold Surface", Journal of the Optical Society of America, vol. 69, No. 10, Oct. 1979.

Candice H. Brown Elliot et al., "Color Subpixel Rendering Projectors and Flat Panel Displays"; SMPTE Advanced Motion Imaging Conference; Feb. 27-Mar. 1, 2003; pp. 1-4.

Diana C. Chen, "Display Resolution Enhancement with Optical Scanners" Applied Optics, vol. 40, No. 5, Feb. 10, 2001, pp. 636-643.

Thomas D. Kite et al. "A Fast, High-Quality Inverse Halftoning Algorithm for Error Diffused Halftones" IEEE Transactions on Image Processing, vol. 9, No. 9, Sep. 2000.

* cited by examiner

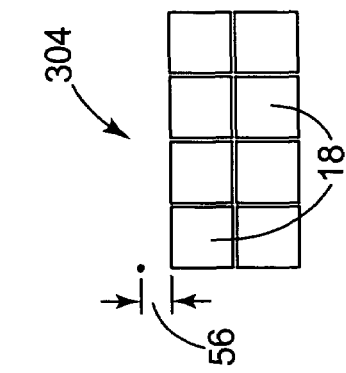
Fig. 3D
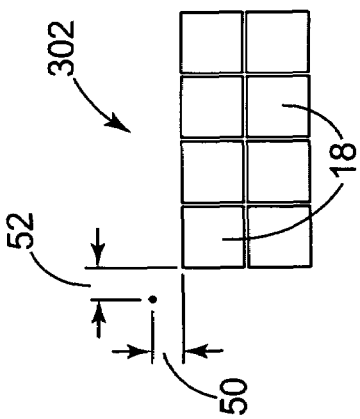
Fig. 3C
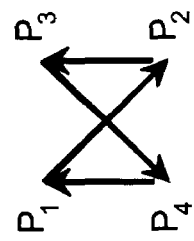
Fig. 3E
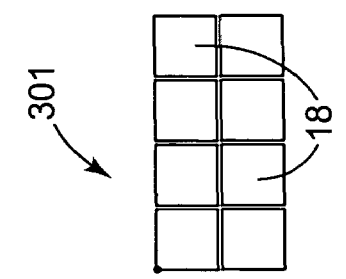
Fig. 3B
Fig. 3A (NEAREST NEIGHBOR)

(BILINEAR)

GENERATING AND DISPLAYING SPATIALLY OFFSET SUB-FRAMES USING A SHARPENING FACTOR

CROSS-REFERENCE TO RELATED APPLICATIONS

This application is related to U.S. patent application Ser. No. 10/213,555, filed on Aug. 7, 2002, entitled IMAGE DISPLAY SYSTEM AND METHOD, now U.S. Pat. No. 7,030,894; U.S. patent application Ser. No. 10/242,195, filed on Sep. 11, 2002, entitled IMAGE DISPLAY SYSTEM AND METHOD, now U.S. Pat. No. 7,034,811; U.S. patent application Ser. No. 10/242,545, filed on Sep. 11, 2002, entitled IMAGE DISPLAY SYSTEM AND METHOD, now U.S. Pat. No. 6,963,319; U.S. patent application Ser. No. 10/631,681, filed Jul. 31, 2003, entitled GENERATING AND DISPLAYING SPATIALLY OFFSET SUB-FRAMES, now U.S. Pat. No. 7,109,981; U.S. patent application Ser. No. 10/632,042, filed Jul. 31, 2003, entitled GENERATING AND DISPLAYING SPATIALLY OFFSET SUB-FRAMES; U.S. patent application Ser. No. 10/672,845, filed Sep. 26, 2003, entitled GENERATING AND DISPLAYING SPATIALLY OFFSET SUB-FRAMES, now U.S. Pat. No. 7,190,380; U.S. patent application Ser. No. 10/672,544, filed Sep. 26, 2003, entitled GENERATING AND DISPLAYING SPATIALLY OFFSET SUB-FRAMES, now U.S. Pat. No. 7,253,811; U.S. patent application Ser. No. 10/697,605, filed Oct. 30, 2003, entitled GENERATING AND DISPLAYING SPATIALLY OFFSET SUB-FRAMES ON A DIAMOND GRID; U.S. patent application Ser. No. 10/696,888, filed Oct. 30, 2003, entitled GENERATING AND DISPLAYING SPATIALLY OFFSET SUB-FRAMES ON DIFFERENT TYPES OF GRIDS; U.S. patent application Ser. No. 10/697,830, filed Oct. 30, 2003, entitled IMAGE DISPLAY SYSTEM AND METHOD, now U.S. Pat. No. 6,927,890; U.S. patent application Ser. No. 10/750,591, filed Dec. 31, 2003, entitled DISPLAYING SPATIALLY OFFSET SUB-FRAMES WITH A DISPLAY DEVICE HAVING A SET OF DEFECTIVE DISPLAY PIXELS; U.S. patent application Ser. No. 10/768,621, filed Jan. 30, 2004, entitled GENERATING AND DISPLAYING SPATIALLY OFFSET SUB-FRAMES; U.S. patent application Ser. No. 10/768,215, filed Jan. 30, 2004, entitled DISPLAYING SUB-FRAMES AT SPATIALLY OFFSET POSITIONS ON A CIRCLE; U.S. patent application Ser. No. 10/821,135, filed Apr. 8, 2004, entitled GENERATING AND DISPLAYING SPATIALLY OFFSET SUB-FRAMES; U.S. patent application Ser. No. 10/821,130, filed Apr. 8, 2004, entitled GENERATING AND DISPLAYING SPATIALLY OFFSET SUB-FRAMES; U.S. patent application Ser. No. 10/820,952, filed Apr. 8, 2004, entitled GENERATING AND DISPLAYING SPATIALLY OFFSET SUB-FRAMES; U.S. patent application Ser. No. 10/864,125, filed Jun. 9, 2004, entitled GENERATING AND DISPLAYING SPATIALLY OFFSET SUB-FRAMES; U.S. patent application Ser. No. 10/868,719, filed Jun. 15, 2004, entitled GENERATING AND DISPLAYING SPATIALLY OFFSET SUB-FRAMES, and U.S. patent application Ser. No. 10/868,638, filed Jun. 15, 2004, entitled GENERATING AND DISPLAYING SPATIALLY OFFSET SUB-FRAMES. Each of the above U.S. Patent Applications is assigned to the assignee of the present invention, and is hereby incorporated by reference herein.

BACKGROUND

A conventional system or device for displaying an image, such as a display, projector, or other imaging system, produces a displayed image by addressing an array of individual picture elements or pixels arranged in horizontal rows and vertical columns. A resolution of the displayed image is defined as the number of horizontal rows and vertical columns of individual pixels forming the displayed image. The resolution of the displayed image is affected by a resolution of the display device itself as well as a resolution of the image data processed by the display device and used to produce the displayed image.

Typically, to increase a resolution of the displayed image, the resolution of the display device as well as the resolution of the image data used to produce the displayed image must be increased. Increasing a resolution of the display device, however, increases a cost and complexity of the display device. In addition, higher resolution image data may not be available and/or may be difficult to generate.

SUMMARY

One form of the present invention provides a method of displaying an image with a display device. The method includes generating a first sub-frame and a second sub-frame corresponding to image data for the image including calculating a first sub-frame pixel value in the first sub-frame using a first sharpening factor associated with a first plurality of gradients from the image data, and alternating between displaying the first sub-frame in a first position and displaying the second sub-frame in a second position spatially offset from the first position.

BRIEF DESCRIPTION OF THE DRAWINGS

FIGS. 3A-3E are schematic diagrams illustrating the display of four sub-frames according to one embodiment of the present invention.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Spatial and Temporal Shifting of Sub-Frames

Some display systems, such as some digital light projectors, may not have sufficient resolution to display some high resolution images. Such systems can be configured to give the appearance to the human eye of higher resolution images by displaying spatially and temporally shifted lower resolution images. The lower resolution images are referred to as sub-frames. A problem of sub-frame generation, which is addressed by embodiments of the present invention, is to determine appropriate values for the sub-frames so that the displayed sub-frames are close in appearance to how the high-resolution image from which the sub-frames were derived would appear if directly displayed.

One embodiment of a display system that provides the appearance of enhanced resolution through temporal and spatial shifting of sub-frames is described in the above-cited U.S. patent applications, and is summarized below with reference to FIGS. 1-4E.

Figure 1:
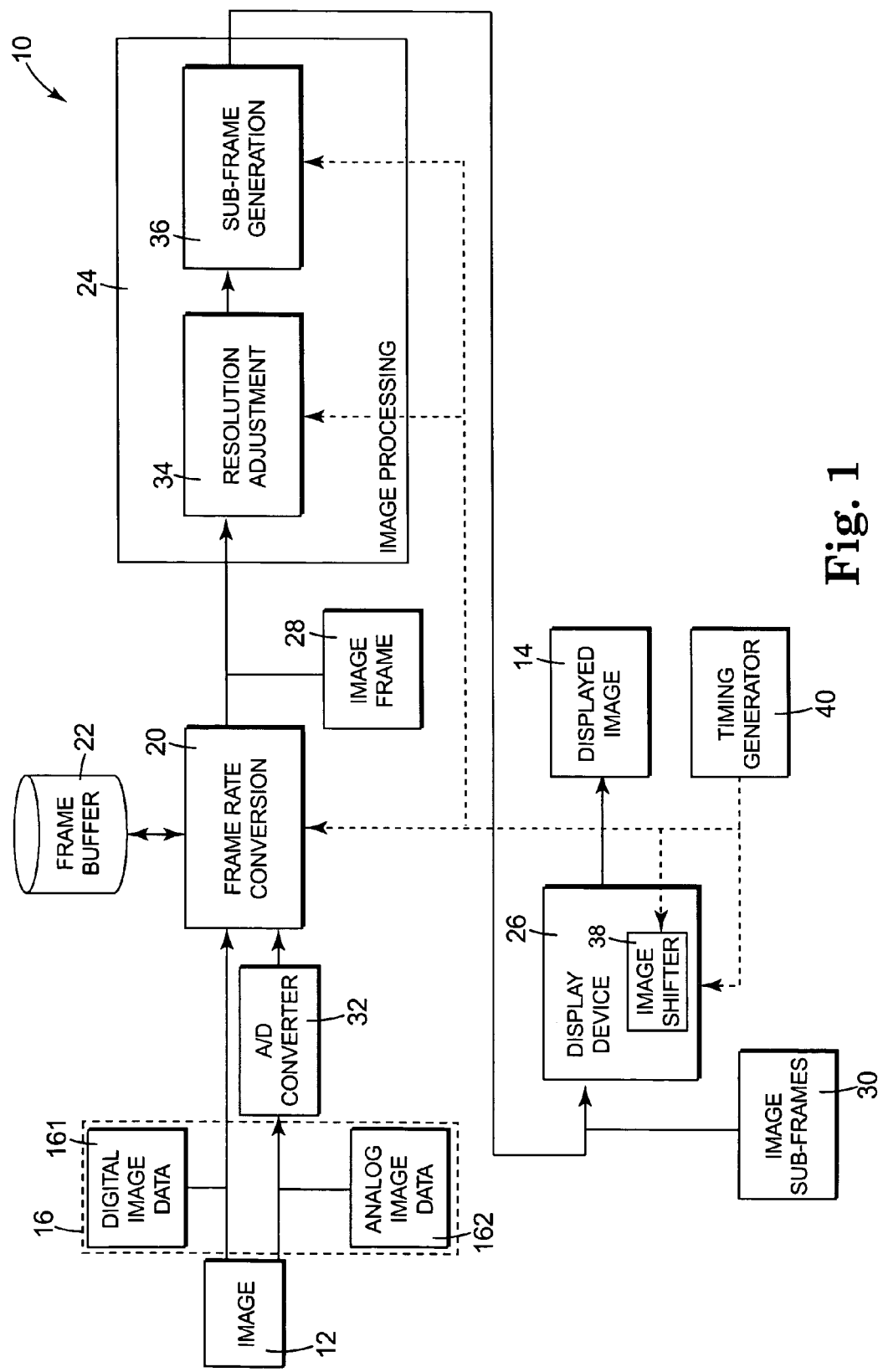
FIG. 1 is a block diagram illustrating an image display system according to one embodiment of the present invention.

FIG. 1 is a block diagram illustrating an image display system 10 according to one embodiment of the present invention. Image display system 10 facilitates processing of an image 12 to create a displayed image 14. Image 12 is defined to include any pictorial, graphical, and/or textural characters, symbols, illustrations, and/or other representation of information. Image 12 is represented, for example, by image data 16. Image data 16 includes individual picture elements or pixels of image 12. While one image is illustrated and described as being processed by image display system 10, it is understood that a plurality or series of images may be processed and displayed by image display system 10.

In one embodiment, image display system 10 includes a frame rate conversion unit 20 and an image frame buffer 22, an image processing unit 24, and a display device 26. As described below, frame rate conversion unit 20 and image frame buffer 22 receive and buffer image data 16 for image 12 to create an image frame 28 for image 12. Image processing unit 24 processes image frame 28 to define one or more image sub-frames 30 for image frame 28, and display device 26 temporally and spatially displays image sub-frames 30 to produce displayed image 14.

Image display system 10, including frame rate conversion unit 20 and/or image processing unit 24, includes hardware, software, firmware, or a combination of these. In one embodiment, one or more components of image display system 10, including frame rate conversion unit 20 and/or image processing unit 24, are included in a computer, computer server, or other microprocessor-based system capable of performing a sequence of logic operations. In addition, processing can be distributed throughout the system with individual portions being implemented in separate system components.

Image data 16 may include digital image data 161 or analog image data 162. To process analog image data 162, image display system 10 includes an analog-to-digital (A/D) converter 32. As such, A/D converter 32 converts analog image data 162 to digital form for subsequent processing. Thus, image display system 10 may receive and process digital image data 161 and/or analog image data 162 for image 12.

Frame rate conversion unit 20 receives image data 16 for image 12 and buffers or stores image data 16 in image frame buffer 22. More specifically, frame rate conversion unit 20 receives image data 16 representing individual lines or fields of image 12 and buffers image data 16 in image frame buffer 22 to create image frame 28 for image 12. Image frame buffer 22 buffers image data 16 by receiving and storing all of the image data for image frame 28, and frame rate conversion unit 20 creates image frame 28 by subsequently retrieving or extracting all of the image data for image frame 28 from image frame buffer 22. As such, image frame 28 is defined to include a plurality of individual lines or fields of image data 16 representing an entirety of image 12. Thus, image frame 28 includes a plurality of columns and a plurality of rows of individual pixels representing image 12.

Frame rate conversion unit 20 and image frame buffer 22 can receive and process image data 16 as progressive image data and/or interlaced image data. With progressive image data, frame rate conversion unit 20 and image frame buffer 22 receive and store sequential fields of image data 16 for image 12. Thus, frame rate conversion unit 20 creates image frame 28 by retrieving the sequential fields of image data 16 for image 12. With interlaced image data, frame rate conversion unit 20 and image frame buffer 22 receive and store odd fields and even fields of image data 16 for image 12. For example, all of the odd fields of image data 16 are received and stored and all of the even fields of image data 16 are received and stored. As such, frame rate conversion unit 20 de-interlaces image data 16 and creates image frame 28 by retrieving the odd and even fields of image data 16 for image 12.

Image frame buffer 22 includes memory for storing image data 16 for one or more image frames 28 of respective images 12. Thus, image frame buffer 22 constitutes a database of one or more image frames 28. Examples of image frame buffer 22 include non-volatile memory (e.g., a hard disk drive or other persistent storage device) and may include volatile memory (e.g., random access memory (RAM)).

By receiving image data 16 at frame rate conversion unit 20 and buffering image data 16 with image frame buffer 22, input timing of image data 16 can be decoupled from a timing requirement of display device 26. More specifically, since image data 16 for image frame 28 is received and stored by image frame buffer 22, image data 16 can be received as input at any rate. As such, the frame rate of image frame 28 can be converted to the timing requirement of display device 26. Thus, image data 16 for image frame 28 can be extracted from image frame buffer 22 at a frame rate of display device 26.

In one embodiment, image processing unit 24 includes a resolution adjustment unit 34 and a sub-frame generation unit 36. As described below, resolution adjustment unit 34 receives image data 16 for image frame 28 and adjusts a resolution of image data 16 for display on display device 26, and sub-frame generation unit 36 generates a plurality of image sub-frames 30 for image frame 28. More specifically, image processing unit 24 receives image data 16 for image frame 28 at an original resolution and processes image data 16 to increase, decrease, and/or leave unaltered the resolution of image data 16. Accordingly, with image processing unit 24, image display system 10 can receive and display image data 16 of varying resolutions.

Sub-frame generation unit 36 receives and processes image data 16 for image frame 28 to define a plurality of image sub-frames 30 for image frame 28. If resolution adjustment unit 34 has adjusted the resolution of image data 16, sub-frame generation unit 36 receives image data 16 at the adjusted resolution. The adjusted resolution of image data 16 may be increased, decreased, or the same as the original resolution of image data 16 for image frame 28. Sub-frame generation unit 36 generates image sub-frames 30 with a resolution which matches the resolution of display device 26. Image sub-frames 30 are each of an area equal to image frame 28. Sub-frames 30 each include a plurality of columns and a plurality of rows of individual pixels representing a subset of image data 16 of image 12, and have a resolution that matches the resolution of display device 26.

Each image sub-frame 30 includes a matrix or array of pixels for image frame 28. Image sub-frames 30 are spatially offset from each other such that each image sub-frame 30 includes different pixels and/or portions of pixels. As such, image sub-frames 30 are offset from each other by a vertical distance and/or a horizontal distance, as described below.

Display device 26 receives image sub-frames 30 from image processing unit 24 and sequentially displays image sub-frames 30 to create displayed image 14. More specifically, as image sub-frames 30 are spatially offset from each other, display device 26 displays image sub-frames 30 in different positions according to the spatial offset of image sub-frames 30, as described below. As such, display device 26 alternates between displaying image sub-frames 30 for image frame 28 to create displayed image 14. Accordingly, display device 26 displays an entire sub-frame 30 for image frame 28 at one time.

In one embodiment, display device 26 performs one cycle of displaying image sub-frames 30 for each image frame 28. Display device 26 displays image sub-frames 30 so as to be spatially and temporally offset from each other. In one embodiment, display device 26 optically steers image sub-frames 30 to create displayed image 14. As such, individual pixels of display device 26 are addressed to multiple locations.

In one embodiment, display device 26 includes an image shifter 38. Image shifter 38 spatially alters or offsets the position of image sub-frames 30 as displayed by display device 26. More specifically, image shifter 38 varies the position of display of image sub-frames 30, as described below, to produce displayed image 14.

In one embodiment, display device 26 includes a light modulator for modulation of incident light. The light modulator includes, for example, a plurality of micro-mirror devices arranged to form an array of micro-mirror devices. As such, each micro-mirror device constitutes one cell or pixel of display device 26. Display device 26 may form part of a display, projector, or other imaging system.

In one embodiment, image display system 10 includes a timing generator 40. Timing generator 40 communicates, for example, with frame rate conversion unit 20, image processing unit 24, including resolution adjustment unit 34 and sub-frame generation unit 36, and display device 26, including image shifter 38. As such, timing generator 40 synchronizes buffering and conversion of image data 16 to create image frame 28, processing of image frame 28 to adjust the resolution of image data 16 and generate image sub-frames 30, and positioning and displaying of image sub-frames 30 to produce displayed image 14. Accordingly, timing generator 40 controls timing of image display system 10 such that entire sub-frames of image 12 are temporally and spatially displayed by display device 26 as displayed image 14.

Figure 2C:
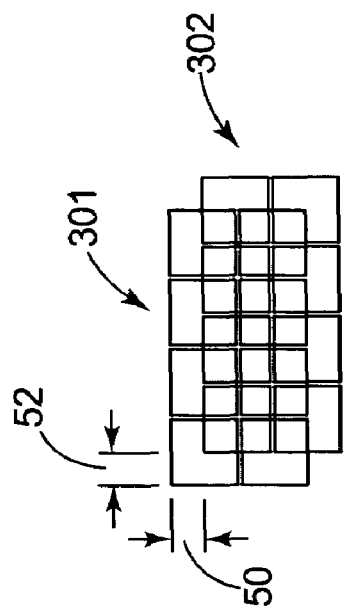
FIGS. 2A-2C are schematic diagrams illustrating the display of two sub-frames according to one embodiment of the present invention.
Figure 2B:
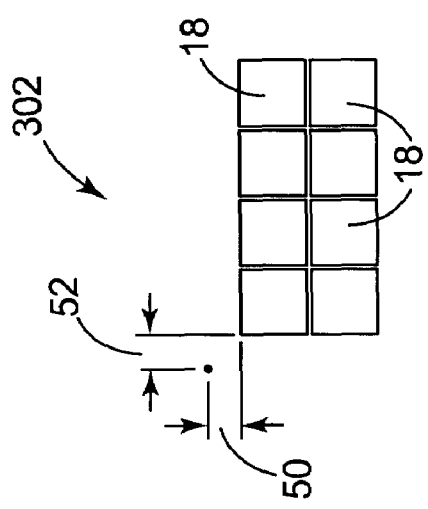
Figure 2A:
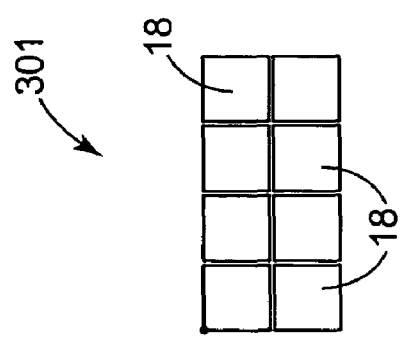

In one embodiment, as illustrated in FIGS. 2A and 2B, image processing unit 24 defines two image sub-frames 30 for image frame 28. More specifically, image processing unit 24 defines a first sub-frame 30₁ and a second sub-frame 30₂ for image frame 28. As such, first sub-frame 30₁ and second sub-frame 30₂ each include a plurality of columns and a plurality of rows of individual pixels 18 of image data 16. Thus, first sub-frame 30₁ and second sub-frame 30₂ each constitute an image data array or pixel matrix of a subset of image data 16.

In one embodiment, as illustrated in FIG. 2B, second sub-frame 30₂ is offset from first sub-frame 30₁ by a vertical distance 50 and a horizontal distance 52. As such, second sub-frame 30₂ is spatially offset from first sub-frame 30₁ by a predetermined distance. In one illustrative embodiment, vertical distance 50 and horizontal distance 52 are each approximately one-half of one pixel.

As illustrated in FIG. 2C, display device 26 alternates between displaying first sub-frame 30₁ in a first position and displaying second sub-frame 30₂ in a second position spatially offset from the first position. More specifically, display device 26 shifts display of second sub-frame 30₂ relative to display of first sub-frame 30₁ by vertical distance 50 and horizontal distance 52. As such, pixels of first sub-frame 30₁ overlap pixels of second sub-frame 30₂. In one embodiment, display device 26 performs one cycle of displaying first sub-frame 30₁ in the first position and displaying second sub-frame 30₂ in the second position for image frame 28. Thus, second sub-frame 30₂ is spatially and temporally displayed relative to first sub-frame 30₁. The display of two temporally and spatially shifted sub-frames in this manner is referred to herein as two-position processing.

In another embodiment, as illustrated in FIGS. 3A-3D, image processing unit 24 defines four image sub-frames 30 for image frame 28. More specifically, image processing unit 24 defines a first sub-frame 301, a second sub-frame 302, a third sub-frame 303, and a fourth sub-frame 304 for image frame 28. As such, first sub-frame 301, second sub-frame 302, third sub-frame 303, and fourth sub-frame 304 each include a plurality of columns and a plurality of rows of individual pixels 18 of image data 16.

In one embodiment, as illustrated in FIGS. 3B-3D, second sub-frame 302 is offset from first sub-frame 301 by a vertical distance 50 and a horizontal distance 52, third sub-frame 303 is offset from first sub-frame 301 by a horizontal distance 54, and fourth sub-frame 304 is offset from first sub-frame 301 by a vertical distance 56. As such, second sub-frame 302, third sub-frame 303, and fourth sub-frame 304 are each spatially offset from each other and spatially offset from first sub-frame 301 by a predetermined distance. In one illustrative embodiment, vertical distance 50, horizontal distance 52, horizontal distance 54, and vertical distance 56 are each approximately one-half of one pixel.

As illustrated schematically in FIG. 3E, display device 26 alternates between displaying first sub-frame 301 in a first position $P_1$, displaying second sub-frame 302 in a second position $P_2$ spatially offset from the first position, displaying third sub-frame 303 in a third position $P_3$ spatially offset from the first position, and displaying fourth sub-frame 304 in a fourth position $P_4$ spatially offset from the first position. More specifically, display device 26 shifts display of second sub-frame 302, third sub-frame 303, and fourth sub-frame 304 relative to first sub-frame 301 by the respective predetermined distance. As such, pixels of first sub-frame 301, second sub-frame 302, third sub-frame 303, and fourth sub-frame 304 overlap each other.

In one embodiment, display device 26 performs one cycle of displaying first sub-frame 301 in the first position, displaying second sub-frame 302 in the second position, displaying third sub-frame 303 in the third position, and displaying fourth sub-frame 304 in the fourth position for image frame 28. Thus, second sub-frame 302, third sub-frame 303, and fourth sub-frame 304 are spatially and temporally displayed relative to each other and relative to first sub-frame 301. The display of four temporally and spatially shifted sub-frames in this manner is referred to herein as four-position processing.

Figure 4E:
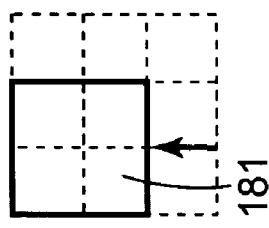
FIGS. 4A-4E are schematic diagrams illustrating the display of a pixel with an image display system according to one embodiment of the present invention.
Figure 4D:
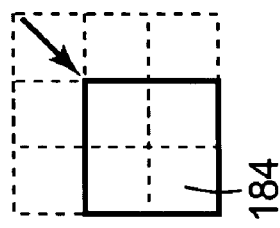
Figure 4C:
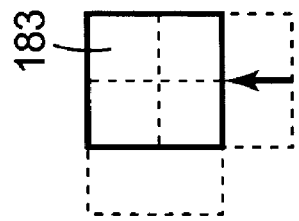
Figure 4B:
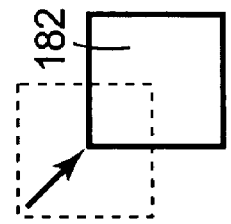
Figure 4A:
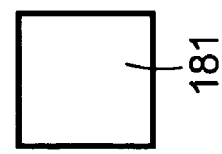

FIGS. 4A-4E illustrate one embodiment of completing one cycle of displaying a pixel 181 from first sub-frame 301 in the first position, displaying a pixel 182 from second sub-frame 302 in the second position, displaying a pixel 183 from third sub-frame 303 in the third position, and displaying a pixel 184 from fourth sub-frame 304 in the fourth position. More specifically, FIG. 4A illustrates display of pixel 181 from first sub-frame 301 in the first position, FIG. 4B illustrates display of pixel 182 from second sub-frame 302 in the second position (with the first position being illustrated by dashed lines), FIG. 4C illustrates display of pixel 183 from third sub-frame 303 in the third position (with the first position and the second position being illustrated by dashed lines), FIG. 4D illustrates display of pixel 184 from fourth sub-frame 304 in the fourth position (with the first position, the second position, and the third position being illustrated by dashed lines), and FIG. 4E illustrates display of pixel 181 from first sub-frame 301 in the first position (with the second position, the third position, and the fourth position being illustrated by dashed lines).

Sub-frame generation unit 36 (FIG. 1) generates sub-frames 30 based on image data in image frame 28. It will be understood by a person of ordinary skill in the art that functions performed by sub-frame generation unit 36 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

In one form of the invention, sub-frames 30 have a lower resolution than image frame 28. Thus, sub-frames 30 are also referred to herein as low resolution images 30, and image frame 28 is also referred to herein as a high resolution image 28. It will be understood by persons of ordinary skill in the art that the terms low resolution and high resolution are used herein in a comparative fashion, and are not limited to any particular minimum or maximum number of pixels. In one embodiment, sub-frame generation unit 36 is configured to generate sub-frames 30 based on one of five algorithms. These five algorithms are referred to herein as the following: (1) nearest neighbor; (2) bilinear; (3) spatial domain; (4) frequency domain; and (5) adaptive multi-pass.

The nearest neighbor algorithm and the bilinear algorithm according to one form of the invention generate sub-frames 30 by combining pixels from a high resolution image 28. The spatial domain algorithm and the frequency domain algorithm according to one form of the invention generate sub-frames 30 based on the minimization of a global error metric that represents a difference between a simulated high resolution image and a desired high resolution image 28. The adaptive multi-pass algorithm according to one form of the invention generates sub-frames 30 based on the minimization of a local error metric. In one embodiment, sub-frame generation unit 36 includes memory for storing a relationship between sub-frame values and high resolution image values, wherein the relationship is based on minimization of an error metric between the high resolution image values and a simulated high resolution image that is a function of the sub-frame values. Embodiments of each of these five algorithms are described below with reference to FIGS. 5-18.

II. Nearest Neighbor

Figure 5:
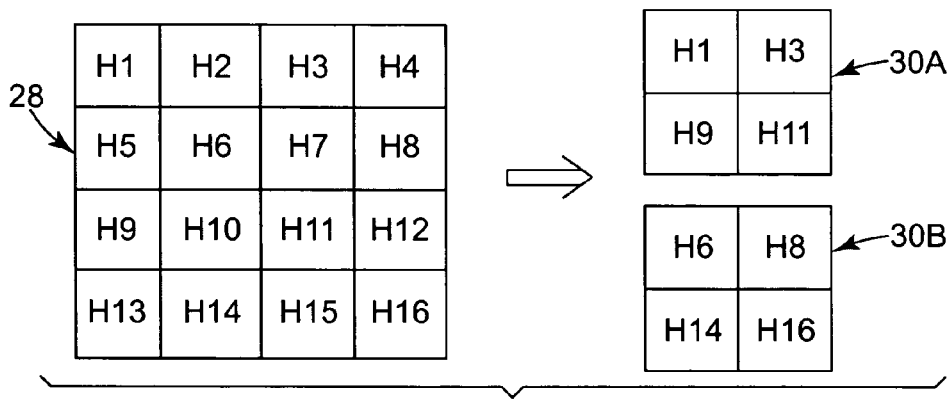
FIG. 5 is a diagram illustrating the generation of low resolution sub-frames from an original high resolution image using a nearest neighbor algorithm according to one embodiment of the present invention.

FIG. 5 is a diagram illustrating the generation of low resolution sub-frames 30A and 30B (collectively referred to as sub-frames 30) from an original high resolution image 28 using a nearest neighbor algorithm according to one embodiment of the present invention. In the illustrated embodiment, high resolution image 28 includes four columns and four rows of pixels, for a total of sixteen pixels H1-H16. In one embodiment of the nearest neighbor algorithm, a first sub-frame 30A is generated by taking every other pixel in a first row of the high resolution image 28, skipping the second row of the high resolution image 28, taking every other pixel in the third row of the high resolution image 28, and repeating this process throughout the high resolution image 28. Thus, as shown in FIG. 5, the first row of sub-frame 30A includes pixels H1 and H3, and the second row of sub-frame 30A includes pixels H9 and H11. In one form of the invention, a second sub-frame 30B is generated in the same manner as the first sub-frame 30A, but the process begins at a pixel H6 that is shifted down one row and over one column from the first pixel H1. Thus, as shown in FIG. 5, the first row of sub-frame 30B includes pixels H6 and H8, and the second row of sub-frame 30B includes pixels H14 and H16.

In one embodiment, the nearest neighbor algorithm is implemented with a 2×2 filter with three filter coefficients of "0" and a fourth filter coefficient of "1" to generate a weighted sum of the pixel values from the high resolution image. Displaying sub-frames 30A and 30B using two-position processing as described above gives the appearance of a higher resolution image. The nearest neighbor algorithm is also applicable to four-position processing, and is not limited to images having the number of pixels shown in FIG. 5.

III. Bilinear

Figure 6:
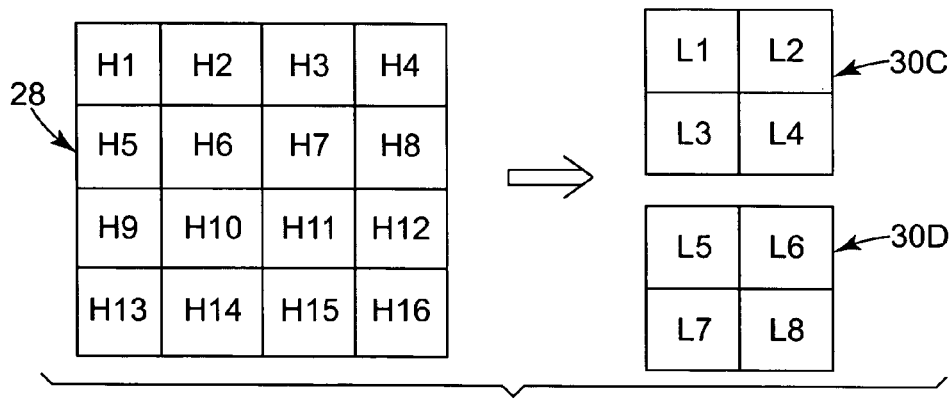
FIG. 6 is a diagram illustrating the generation of low resolution sub-frames from an original high resolution image using a bilinear algorithm according to one embodiment of the present invention.

FIG. 6 is a diagram illustrating the generation of low resolution sub-frames 30C and 30D (collectively referred to as sub-frames 30) from an original high resolution image 28 using a bilinear algorithm according to one embodiment of the present invention. In the illustrated embodiment, high resolution image 28 includes four columns and four rows of pixels, for a total of sixteen pixels H1-H16. Sub-frame 30C includes two columns and two rows of pixels, for a total of four pixels L1-L4. And sub-frame 30D includes two columns and two rows of pixels, for a total of four pixels L5-L8.

In one embodiment, the values for pixels L1-L8 in sub-frames 30C and 30D are generated from the pixel values H1-H16 of image 28 based on the following Equations I-VIII:

$$L1=(4H1+2H2+2H5)/8 \qquad \text{Equation I}$$

$$L2=(4H3+2H4+2H7)/8 \qquad \text{Equation II}$$

$$L3=(4H9+2H10+2H13)/8 \qquad \text{Equation III}$$

$$L4=(4H11+2H12+2H15)/8 \qquad \text{Equation IV}$$

$$L5=(4H6+2H2+2H5)/8 \qquad \text{Equation V}$$

$$L6=(4H8+2H4+2H7)/8 \qquad \text{Equation VI}$$

$$L7=(4H14+2H10+2H13)/8 \qquad \text{Equation VII}$$

$$L8=(4H16+2H12+2H15)/8 \qquad \text{Equation VIII}$$

As can be seen from the above Equations I-VIII, the values of the pixels L1-L4 in sub-frame 30C are influenced the most by the values of pixels H1, H3, H9, and H11, respectively, due to the multiplication by four. But the values for the pixels L1-L4 in sub-frame 30C are also influenced by the values of diagonal neighbors of pixels H1, H3, H9, and H11. Similarly, the values of the pixels L5-L8 in sub-frame 30D are influenced the most by the values of pixels H6, H8, H14, and H16, respectively, due to the multiplication by four. But the values for the pixels L5-L8 in sub-frame 30D are also influenced by the values of diagonal neighbors of pixels H6, H8, H14, and H16.

In one embodiment, the bilinear algorithm is implemented with a 2×2 filter with one filter coefficient of "0" and three filter coefficients having a non-zero value (e.g., 4, 2, and 2) to generate a weighted sum of the pixel values from the high resolution image. In another embodiment, other values are used for the filter coefficients. Displaying sub-frames 30C and 30D using two-position processing as described above gives the appearance of a higher resolution image. The bilinear algorithm is also applicable to four-position processing, and is not limited to images having the number of pixels shown in FIG. 6.

In one form of the nearest neighbor and bilinear algorithms, sub-frames 30 are generated based on a linear combination of pixel values from an original high resolution image as described above. In another embodiment, sub-frames 30 are generated based on a non-linear combination of pixel values from an original high resolution image. For example, if the original high resolution image is gamma-corrected, appropriate non-linear combinations are used in one embodiment to undo the effect of the gamma curve.

IV. Systems for Generating Simulated High Resolution Images

FIGS. 7-10 illustrate systems for generating simulated high resolution images. Based on these systems, spatial domain, frequency domain, and adaptive multi-pass algorithms for generating sub-frames are developed, as described in further detail below.

Figure 7:
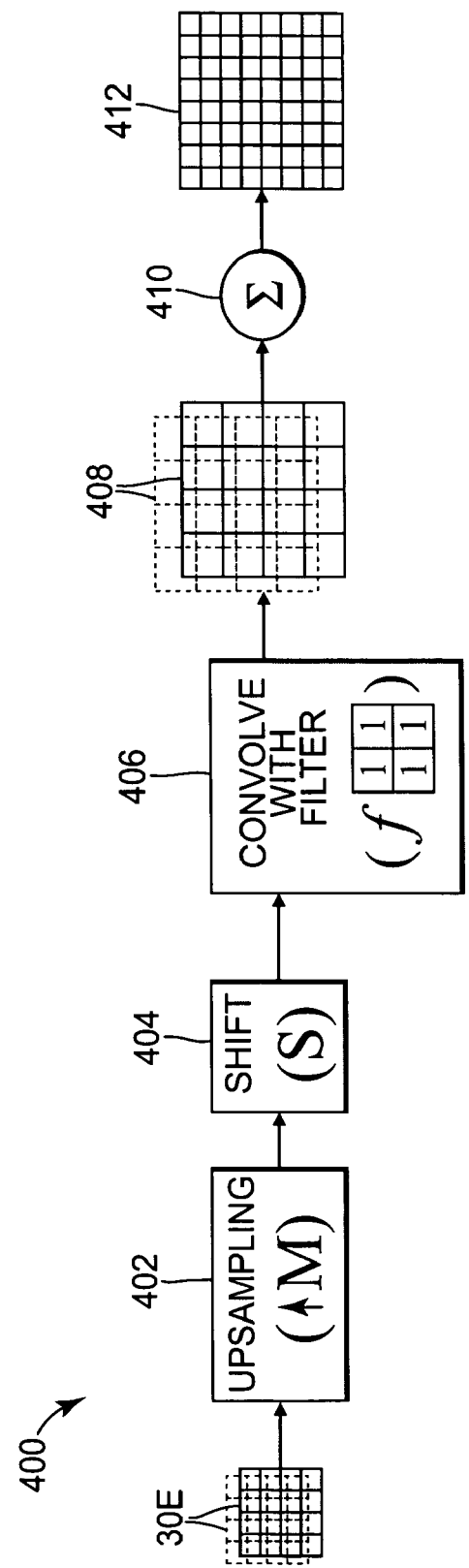
FIG. 7 is a block diagram illustrating a system for generating a simulated high resolution image according to one embodiment of the present invention.

FIG. 7 is a block diagram illustrating a system 400 for generating a simulated high resolution image 412 from two 4×4 pixel low resolution sub-frames 30E according to one embodiment of the present invention. System 400 includes upsampling stage 402, shifting stage 404, convolution stage 406, and summation stage 410. Sub-frames 30E are upsampled by upsampling stage 402 based on a sampling matrix, M, thereby generating upsampled images. The upsampled images are shifted by shifting stage 404 based on a spatial shifting matrix, S, thereby generating shifted upsampled images. The shifted upsampled images are convolved with an interpolating filter at convolution stage 406, thereby generating blocked images 408. In the illustrated embodiment, the interpolating filter is a 2×2 filter with filter coefficients of "1", and with the center of the convolution being the upper left position in the 2×2 matrix. The interpolating filter simulates the superposition of low resolution sub-frames on a high resolution grid. The low resolution sub-frame pixel data is expanded so that the sub-frames can be represented on a high resolution grid. The interpolating filter fills in the missing pixel data produced by upsampling. The blocked images 408 are weighted and summed by summation block 410 to generate the 8×8 pixel simulated high resolution image 412.

Figure 8:
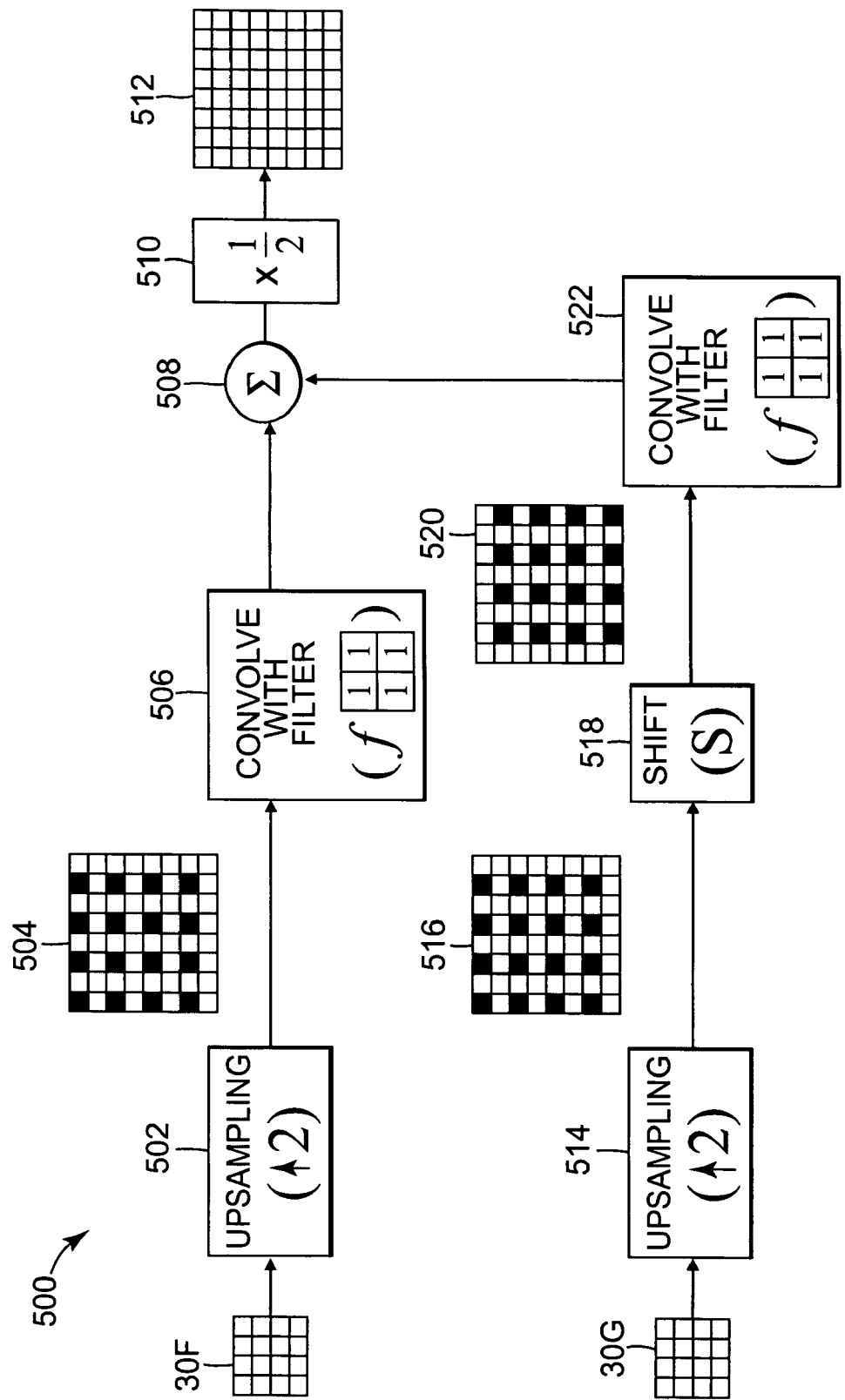
FIG. 8 is a block diagram illustrating a system for generating a simulated high resolution image for two-position processing based on separable upsampling according to one embodiment of the present invention.

FIG. 8 is a block diagram illustrating a system 500 for generating a simulated high resolution image 512 for two-position processing based on separable upsampling of two 4×4 pixel low resolution sub-frames 30F and 30G according to one embodiment of the present invention. System 500 includes upsampling stages 502 and 514, shifting stage 518, convolution stages 506 and 522, summation stage 508, and multiplication stage 510. Sub-frame 30F is upsampled by a factor of two by upsampling stage 502, thereby generating an 8×8 pixel upsampled image 504. The dark pixels in upsampled image 504 represent the sixteen pixels from sub-frame 30F, and the light pixels in upsampled image 504 represent zero values. Sub-frame 30G is upsampled by a factor of two by upsampling stage 514, thereby generating an 8×8 pixel upsampled image 516. The dark pixels in upsampled image 516 represent the sixteen pixels from sub-frame 30G, and the light pixels in upsampled image 516 represent zero values. In one embodiment, upsampling stages 502 and 514 upsample sub-frames 30F and 30G, respectively, using a diagonal sampling matrix.

The upsampled image 516 is shifted by shifting stage 518 based on a spatial shifting matrix, S, thereby generating shifted upsampled image 520. In the illustrated embodiment, shifting stage 518 performs a one pixel diagonal shift. Images 504 and 520 are convolved with an interpolating filter at convolution stages 506 and 522, respectively, thereby generating blocked images. In the illustrated embodiment, the interpolating filter at convolution stages 506 and 522 is a 2×2 filter with filter coefficients of "1", and with the center of the convolution being the upper left position in the 2×2 matrix. The blocked images generated at convolution stages 506 and 522 are summed by summation block 508, and multiplied by a factor of 0.5 at multiplication stage 510, to generate the 8×8 pixel simulated high resolution image 512. The image data is multiplied by a factor of 0.5 at multiplication stage 510 because, in one embodiment, each of the sub-frames 30F and 30G is displayed for only half of the time slot per period allotted to a color. In another embodiment, rather than multiplying by a factor of 0.5 at multiplication stage 510, the filter coefficients of the interpolating filter at stages 506 and 522 are reduced by a factor of 0.5.

In one embodiment, as shown in FIG. 8 and described above, the low resolution sub-frame data is represented by two separate sub-frames 30F and 30G, which are separately upsampled based on a diagonal sampling matrix (i.e., separable upsampling). In another embodiment, as described below with reference to FIG. 9, the low resolution sub-frame data is represented by a single sub-frame, which is upsampled based on a non-diagonal sampling matrix (i.e., non-separable upsampling).

Figure 9:
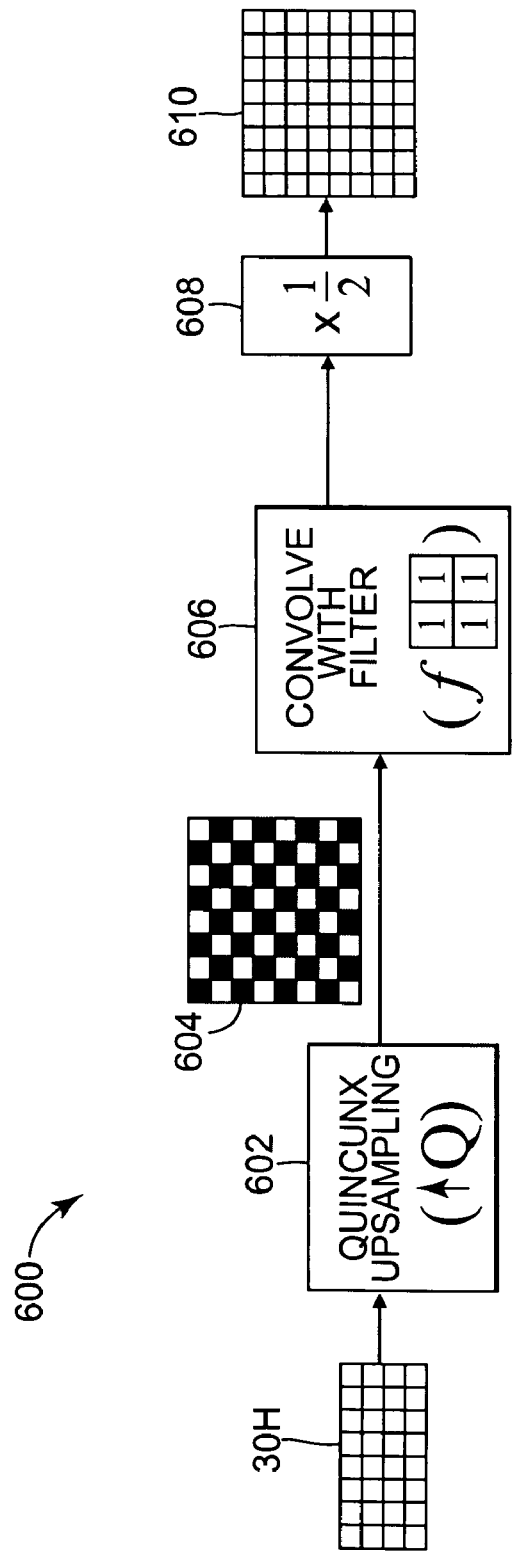
FIG. 9 is a block diagram illustrating a system for generating a simulated high resolution image for two-position processing based on non-separable upsampling according to one embodiment of the present invention.

FIG. 9 is a block diagram illustrating a system 600 for generating a simulated high resolution image 610 for two-position processing based on non-separable upsampling of an 8×4 pixel low resolution sub-frame 30H according to one embodiment of the present invention. System 600 includes quincunx upsampling stage 602, convolution stage 606, and multiplication stage 608. Sub-frame 30H is upsampled by quincunx upsampling stage 602 based on a quincunx sampling matrix, Q, thereby generating upsampled image 604. The dark pixels in upsampled image 604 represent the thirty-two pixels from sub-frame 30H, and the light pixels in upsampled image 604 represent zero values. Sub-frame 30H includes pixel data for two 4×4 pixel sub-frames for two-position processing. The dark pixels in the first, third, fifth, and seventh rows of upsampled image 604 represent pixels for a first 4×4 pixel sub-frame, and the dark pixels in the second, fourth, sixth, and eighth rows of upsampled image 604 represent pixels for a second 4×4 pixel sub-frame.

The upsampled image 604 is convolved with an interpolating filter at convolution stage 606, thereby generating a blocked image. In the illustrated embodiment, the interpolating filter is a 2×2 filter with filter coefficients of "1", and with the center of the convolution being the upper left position in the 2×2 matrix. The blocked image generated by convolution stage 606 is multiplied by a factor of 0.5 at multiplication stage 608, to generate the 8×8 pixel simulated high resolution image 610.

Figure 10:
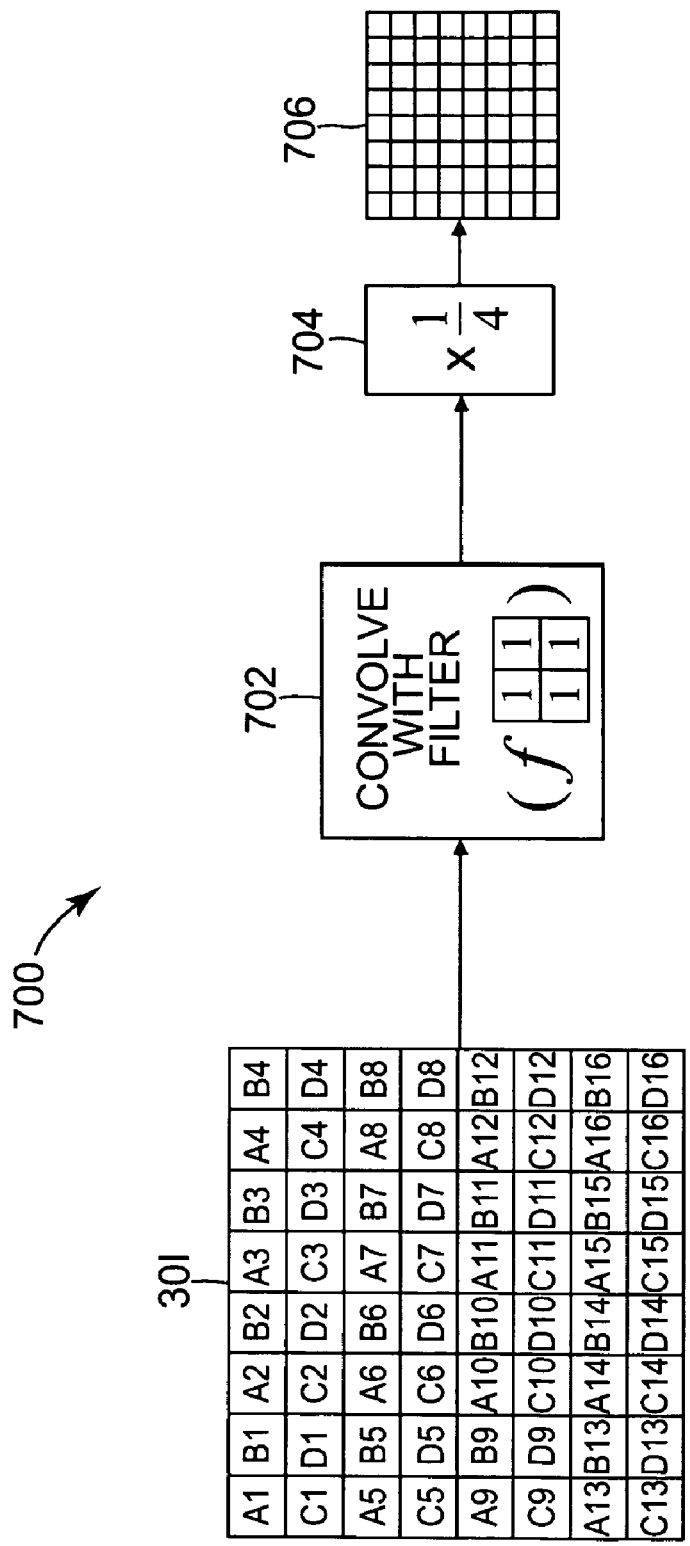
FIG. 10 is a block diagram illustrating a system for generating a simulated high resolution image for four-position processing according to one embodiment of the present invention.

FIG. 10 is a block diagram illustrating a system 700 for generating a simulated high resolution image 706 for four-position processing based on sub-frame 30I according to one embodiment of the present invention. In the embodiment illustrated in FIG. 10, sub-frame 30I is an 8×8 array of pixels. Sub-frame 30I includes pixel data for four 4×4 pixel sub-frames for four-position processing. Pixels A1-A16 represent pixels for a first 4×4 pixel sub-frame, pixels B1-B16 represent pixels for a second 4×4 pixel sub-frame, pixels C1-C16 represent pixels for a third 4×4 pixel sub-frame, and pixels D1-D16 represent pixels for a fourth 4×4 pixel sub-frame.

The sub-frame 30I is convolved with an interpolating filter at convolution stage 702, thereby generating a blocked image. In the illustrated embodiment, the interpolating filter is a 2×2 filter with filter coefficients of "1", and with the center of the convolution being the upper left position in the 2×2 matrix. The blocked image generated by convolution stage 702 is multiplied by a factor of 0.25 at multiplication stage 704, to generate the 8×8 pixel simulated high resolution image 706. The image data is multiplied by a factor of 0.25 at multiplication stage 704 because, in one embodiment, each of the four sub-frames represented by sub-frame 30I is displayed for only one fourth of the time slot per period allotted to a color. In another embodiment, rather than multiplying by a factor of 0.25 at multiplication stage 704, the filter coefficients of the interpolating filter are correspondingly reduced.

V. Generation of Sub-Frames Based on Error Minimization

As described above, systems 400, 500, 600, and 700 generate simulated high resolution images 412, 512, 610, and 706, respectively, based on low resolution sub-frames. If the sub-frames are optimal, the simulated high resolution image will be as close as possible to the original high resolution image 28. Various error metrics may be used to determine how close a simulated high resolution image is to an original high resolution image, including mean square error, weighted mean square error, as well as others.

Figure 11:
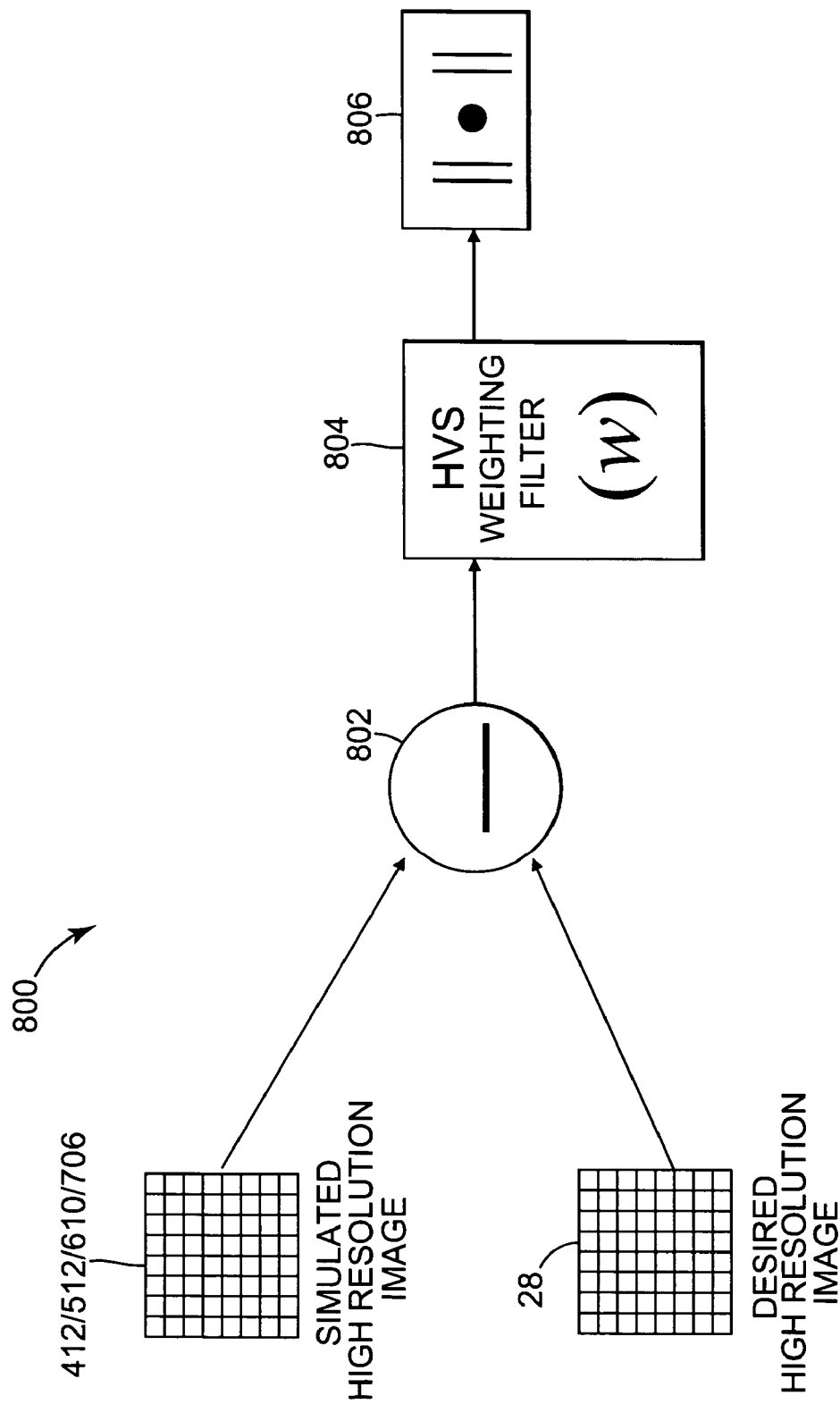
FIG. 11 is a block diagram illustrating the comparison of a simulated high resolution image and a desired high resolution image according to one embodiment of the present invention.

FIG. 11 is a block diagram illustrating the comparison of a simulated high resolution image 412/512/610/706 and a desired high resolution image 28 according to one embodiment of the present invention. A simulated high resolution image 412, 512, 610, or 706, is subtracted on a pixel-by-pixel basis from high resolution image 28 at subtraction stage 802. In one embodiment, the resulting error image data is filtered by a human visual system (HVS) weighting filter (W) 804. In one form of the invention, HVS weighting filter 804 filters the error image data based on characteristics of the human visual system. In one embodiment, HVS weighting filter 804 reduces or eliminates high frequency errors. The mean squared error of the filtered data is then determined at stage 806 to provide a measure of how close the simulated high resolution image 412, 512, 610, or 706 is to the desired high resolution image 28.

In one embodiment, systems 400, 500, 600, and 700 are represented mathematically in an error cost equation that measures the difference between a simulated high resolution image 412, 512, 610, or 706, and the original high resolution image 28. Optimal sub-frames are identified by solving the error cost equation for the sub-frame data that provides the minimum error between the simulated high resolution image and the desired high resolution image. In one embodiment, globally optimum solutions are obtained in the spatial domain and in the frequency domain, and a locally optimum solution is obtained using an adaptive multi-pass algorithm. The spatial domain, frequency domain, and adaptive multi-pass algorithms are described in further detail below with reference to FIGS. 12-18.

VI. Spatial Domain

A spatial domain solution for generating optimal sub-frames according to one embodiment is described in the context of the system 600 shown in FIG. 9. The system 600 shown in FIG. 9 can be represented mathematically in an error cost function by the following Equation IX:

$$l^*_Q = \operatorname*{argmin}_{l_Q} J = \operatorname*{argmin}_{l_Q} \sum_n \left( \sum_k l_Q(k) f(n-k) - h(n) \right)^2 \quad \text{Equation IX}$$

where:
  $l^*_Q$=optimal low resolution data for sub-frame 30H;
  J=error cost function to be minimized;
  n and k=indices for identifying high resolution pixel locations for images 604 and 610;
  $l_Q(k)$=image data from upsampled image 604 at location k;
  f(n−k)=filter coefficient of the interpolating filter at a position n−k; and
  h(n)=image data for desired high resolution image 28 at location n.

The summation of "$l_Q(k)f(n-k)$" in Equation IX represents the convolution of the upsampled image 604 and the interpolating filter, f, performed at stage 606 in system 600. The filter operation is performed by essentially sliding the lower right pixel of the 2×2 interpolating filter over each pixel of the upsampled image 604. The four pixels of the upsampled image 604 within the 2×2 interpolating filter window are multiplied by the corresponding filter coefficient (i.e., "1" in the illustrated embodiment). The results of the four multiplications are summed, and the value for the pixel of the upsampled image 604 corresponding to the lower right position of the interpolating filter is replaced by the sum of the four multiplication results. The high resolution data, h(n), from the high resolution image 28 is subtracted from the convolution value, $l_Q(k)f(n-k)$, to provide an error value. The summation of the squared error over all of the high resolution pixel locations provides a measure of the error to be minimized.

An optimal spatial domain solution can be obtained by taking the derivative of Equation IX with respect to each of the low resolution pixels, and setting it equal to zero as shown in the following Equation X:

$$\frac{\partial J}{\partial l_Q^*(t)} = 0, t \in \Theta \quad \text{Equation X}$$

where:
 $\Theta$=the set of quincunx lattice points.

Thus, as can be seen from Equation X, the derivative is taken only at the set of quincunx lattice points, which correspond to the dark pixels in upsampled image 604 in FIG. 9. Inserting the equation for J given in Equation IX into Equation X, and taking the derivative as specified in Equation X, results in the following Equation XI:

$$\sum_k l_Q^*(k) C_{ff}(t-k) = \sum_n h(n) f(n-t), t \in \Theta \quad \text{Equation XI}$$

The symbol, $C_{ff}$, in Equation XI represents the auto-correlation coefficients of the interpolating filter, f, as defined by the following Equation XII:

$$C_{ff}(n) = \sum_k f(n) f(n+k) \quad \text{Equation XII}$$

Equation XI can be put into vector form as shown in the following Equation XIII:

$$C_{ff} l_Q^* = h_f, t \in \Theta \quad \text{Equation XIII}$$

where:
 $C_{ff}$=matrix of auto-correlation coefficients of the interpolating filter, f.
 $l_Q^*$=vector representing the unknown image data for sub-frame 30H, as well as "don't care" data (i.e., the image data corresponding to the light pixels in upsampled image 604);
 $h_f$=vector representing a filtered version of the simulated high resolution image 610 using the interpolating filter, f.

Deleting the rows and columns corresponding to "don't care" data (i.e., the data that is not in the set of qunincunx lattice points, $\Theta$), results in the following Equation XIV:

$$\tilde{C}_{ff} \tilde{l}_Q^* = \tilde{h}_f \quad \text{Equation XIV}$$

where:
 $\tilde{l}_Q^*$=vector representing only the unknown image data for sub-frame 30H.

The above Equation XIV is a sparse non-Toeplitz system representing a sparse system of linear equations. Since the matrix of auto-correlation coefficients is known, and the vector representing the filtered version of the simulated high resolution image 610 is known, Equation XIV can be solved to determine the optimal image data for sub-frame 30H. In one embodiment, sub-frame generation unit 36 is configured to solve Equation XIV to generate sub-frames 30.

VII. Frequency Domain

A frequency domain solution for generating optimal sub-frames 30 according to one embodiment is described in the context of the system 500 shown in FIG. 8. Before describing the frequency domain solution, a few properties of the fast fourier transform (FFT) that are applicable to the frequency domain solution are described with reference to FIGS. 12 and 13.

Figure 12:
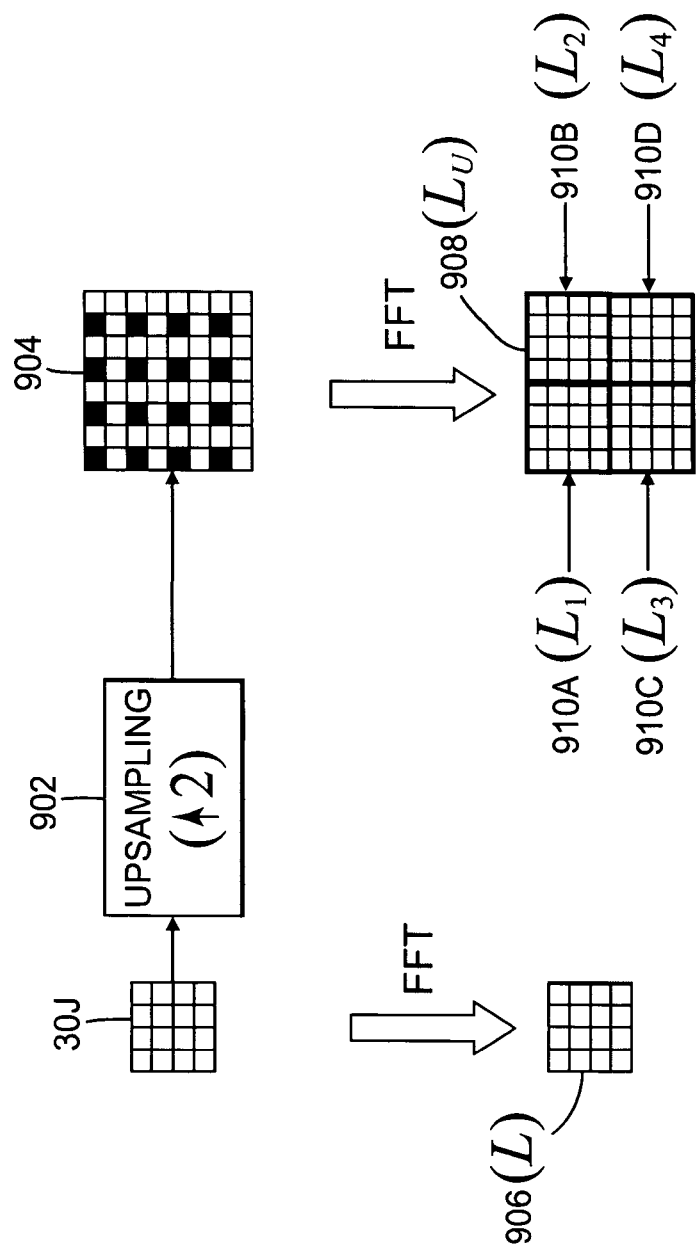
FIG. 12 is a diagram illustrating the effect in the frequency domain of the upsampling of a sub-frame according to one embodiment of the present invention.

FIG. 12 is a diagram illustrating the effect in the frequency domain of the upsampling of a 4×4 pixel sub-frame 30J according to one embodiment of the present invention. As shown in FIG. 12, sub-frame 30J is upsampled by a factor of two by upsampling stage 902 to generate an 8×8 pixel upsampled image 904. The dark pixels in upsampled image 904 represent the sixteen pixels from sub-frame 30J, and the light pixels in upsampled image 904 represent zero values. Taking the FFT of sub-frame 30J results in image (L) 906. Taking the FFT of upsampled image 904 results in image ($L_U$) 908. Image ($L_U$) 908 includes four 4×4 pixel portions, which are image portion ($L_1$) 910A, image portion ($L_2$) 910B, image portion ($L_3$) 910C, and image portion ($L_4$) 910D. As shown in FIG. 12, image portions 910A-910D are each the same as image 906 (i.e., $L_1=L_2=L_3=L_4=L$).

Figure 13:
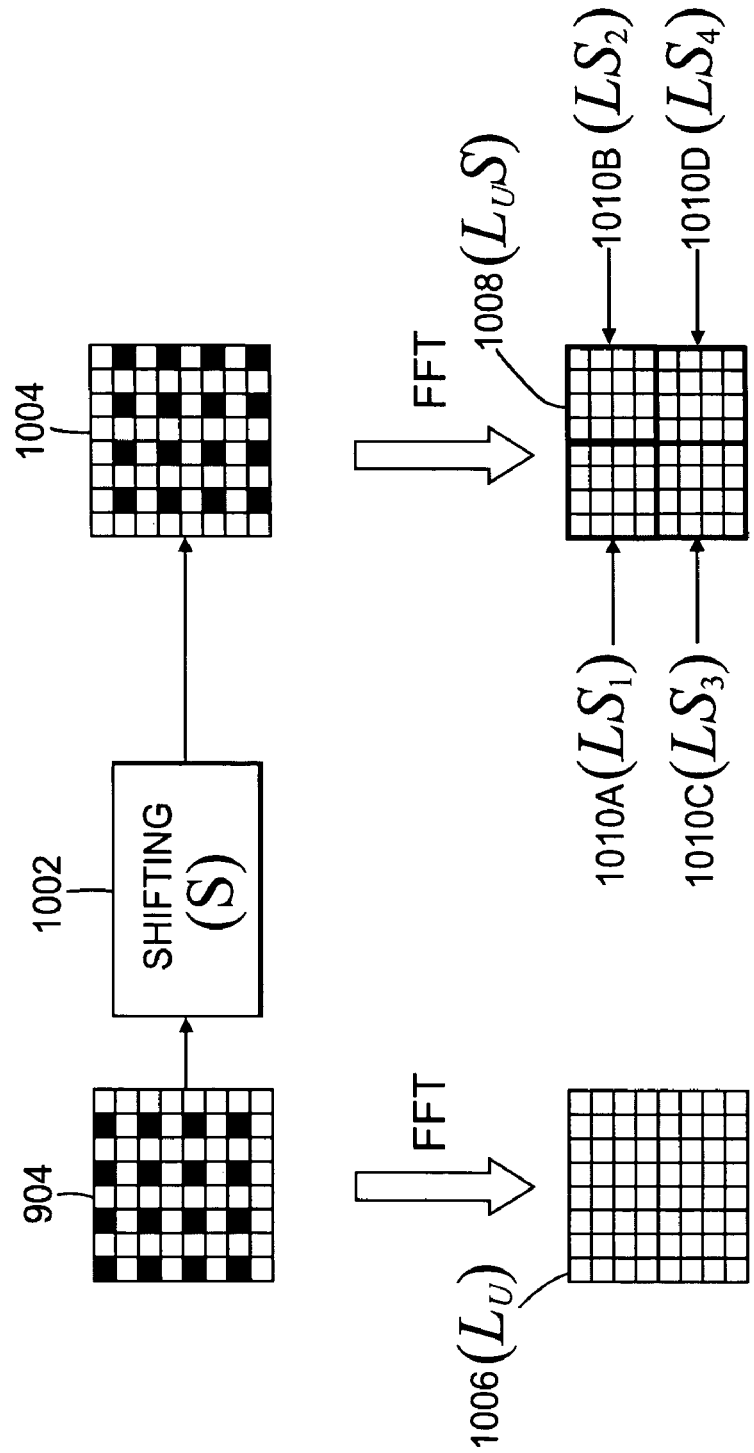
FIG. 13 is a diagram illustrating the effect in the frequency domain of the shifting of an upsampled sub-frame according to one embodiment of the present invention.

FIG. 13 is a diagram illustrating the effect in the frequency domain of the shifting of an 8×8 pixel upsampled sub-frame 904 according to one embodiment of the present invention. As shown in FIG. 13, upsampled sub-frame 904 is shifted by shifting stage 1002 to generate shifted image 1004. Taking the FFT of upsampled sub-frame 904 results in image ($L_U$) 1006. Taking the FFT of shifted image 1004 results in image ($L_US$) 1008. Image ($L_US$) 1008 includes four 4×4 pixel portions, which are image portion ($LS_1$) 1010A, image portion ($LS_2$) 1010B, image portion ($LS_3$) 1010C, and image portion ($LS_4$) 1010D. As shown in FIG. 13, image 1008 is the same as image 1006 multiplied by a complex exponential, W, (i.e., $L_US = W \cdot L_U$), where "·" denotes pointwise multiplication. The values for the complex exponential, W, are given by the following Equation XV:

$$[W]_{(k_1, k_2)} = e^{-\frac{j 2\pi (k_1 + k_2)}{MN}} \quad \text{Equation XV}$$

where:
 $k_1$=row coordinate in the FFT domain;
 $k_2$=column coordinate in the FFT domain;
 M=number of columns in the image; and
 N=number of rows in the image.

The system 500 shown in FIG. 8 can be represented mathematically in an error cost function by the following Equation XVI:

$$(L_A^*, L_B^*) = \underset{(L_A, L_B)}{\text{argmin}} J = \underset{(L_A, L_B)}{\text{argmin}} \quad \text{Equation XVI}$$

-continued $$\sum_i \left[ \hat{F}_i(L_A + \hat{W}_i L_B) - H_i \right]^H \left[ \hat{F}_i(L_A + \hat{W}_i L_B) - H_i \right]$$

where:
- $(L_A^*, L_B^*)$=vectors representing the optimal FFT's of sub-frames 30F and 30G, respectively, shown in FIG. 8;
- J=error cost function to be minimized;
- i=index identifying FFT blocks that are averaged (e.g., for image 908 in FIG. 12, four blocks are averaged, with i=1 corresponding to block 910A, i=2 corresponding to block 910B, i=3 corresponding to block 910C, and i=4 corresponding to block 910D);
- F=matrix representing the FFT of the interpolating filter, f;
- $L_A$=vector representing the FFT of sub-frame 30F shown in FIG. 8;
- $L_B$=vector representing the FFT of sub-frame 30G shown in FIG. 8;
- W=matrix representing the FFT of the complex coefficient given by Equation XV;
- H=vector representing the FFT of the desired high resolution image 28.

The superscript "H" in Equation XVI represents the Hermitian (i.e., $X^H$ is the Hermitian of X). The "hat" over the letters in Equation XVI indicates that those letters represent a diagonal matrix, as defined in the following Equation XVII:

$$\hat{X} = diag(X) = \begin{pmatrix} X_1 & 0 & 0 & 0 \\ 0 & X_2 & 0 & 0 \\ 0 & 0 & X_3 & 0 \\ 0 & 0 & 0 & X_4 \end{pmatrix} \quad \text{Equation XVII}$$

Taking the derivative of Equation XVI with respect to the complex conjugate of $L_A$ and setting it equal to zero results in the following Equation XVIII:

$$\frac{\partial J}{\partial \overline{L}_A} = \underbrace{\sum_i \overline{\hat{F}}_i \hat{F}_i L_A}_{\hat{A}} + \underbrace{\sum_i \overline{\hat{F}}_i \hat{F}_i \hat{W}_i L_B}_{\hat{B}} - \underbrace{\sum_i \overline{\hat{F}}_i H_i}_{C} = 0 \quad \text{Equation XVIII}$$

Taking the derivative of Equation XVI with respect to the complex conjugate of $L_B$ and setting it equal to zero results in the following Equation XIX:

$$\frac{\partial J}{\partial \overline{L}_B} = \underbrace{\sum_i \overline{\hat{W}}_i \overline{\hat{F}}_i \hat{F}_i L_A}_{\overline{\hat{B}}} + \underbrace{\sum_i \overline{\hat{F}}_i \hat{F}_i L_B}_{\hat{A}} - \underbrace{\sum_i \overline{\hat{W}}_i \overline{\hat{F}}_i H_i}_{D} = 0 \quad \text{Equation XIX}$$

The horizontal bar over the letters in Equations XVIII and XIX indicates that those letters represent a complex conjugate (i.e., $\overline{A}$ represents the complex conjugate of A).

Solving Equations XVIII and XIX for $L_A$ and $L_B$ results in the following Equations XX and XXI $$L_B = (\overline{\hat{B}}\hat{A}^{-1}\hat{B})^{-1}(D - \hat{A}^{-1}C) \quad \text{Equation XX}$$

$$L_A = \hat{A}^{-1}(C - \hat{B}L_B) \quad \text{Equation XXI}$$

Equations XX and XXI may be implemented in the frequency domain using pseudo-inverse filtering. In one embodiment, sub-frame generation unit 36 is configured to generate sub-frames 30 based on Equations XX and XXI.

VIII. Adaptive Multi-Pass

An adaptive multi-pass algorithm for generating sub-frames 30 according to one embodiment uses past errors to update estimates for the sub-frame data, and provides fast convergence and low memory requirements. The adaptive multi-pass solution according to one embodiment is described in the context of the system 600 shown in FIG. 9. The system 600 shown in FIG. 9 can be represented mathematically in an error cost function by the following Equation XXII:

$$J^{(n)}(n) = |e^{(n)}(n)|^2 = \left( \sum_k l_Q^{(n)}(k) f(n-k) - h(n) \right)^2 \quad \text{Equation XXII}$$

where:
- n=index identifying the current iteration;
- $J^{(n)}(n)$=error cost function at iteration n;
- $e^{(n)}(n)$=square root of the error cost function, $J^{(n)}(n)$;
- n and k=indices for identifying high resolution pixel locations in images 604 and 610;
- $l_Q^{(n)}(k)$=image data from upsampled image 604 at location k;
- f(n−k)=filter coefficient of the interpolating filter at a position n−k; and
- h(n)=image data for desired high resolution image 28 at location n.

As can be seen from Equation XXII, rather than minimizing a global spatial domain error by summing over the entire high resolution image as shown in Equation IX above, a local spatial domain error, which is a function of n, is being minimized.

A least mean squares (LMS) algorithm is used in one embodiment to determine the update, which is represented in the following Equation XXIII:

$$l_Q^{(n+1)}(t) = l_Q^{(n)}(t) + \alpha \frac{\partial J^{(n)}}{\partial l_Q^{(n)}(t)}, \, t \in \Theta \quad \text{Equation XXIII}$$

where:
- Θ=the set of quincunx lattice points (i.e., the dark pixels in upsampled image 604 in FIG. 9); and
- α=sharpening factor.

Taking the derivative of Equation XXII provides the value for the derivative in Equation XXIII, which is given in the following Equation XXIV:

$$\frac{\partial J^{(n)}(n)}{\partial l_Q^{(n)}(t)} = 2 \left( \sum_k l_Q^{(n)}(k) f(n-k) - h(n) \right) f(n-t) \quad \text{Equation XXIV}$$

In one embodiment, a block-LMS algorithm using the average gradient over a "region of influence" is used to perform the update, as represented by the following Equation XXV:

$$l_Q^{(n+1)}(t) = l_Q^{(n)}(t) + \alpha \sum_{n \in \Omega} \frac{\partial J^{(n)}(n)}{\partial l_Q^{(n)}(t)}$$ Equation XXV where:

Ω=region of influence

Figure 14:
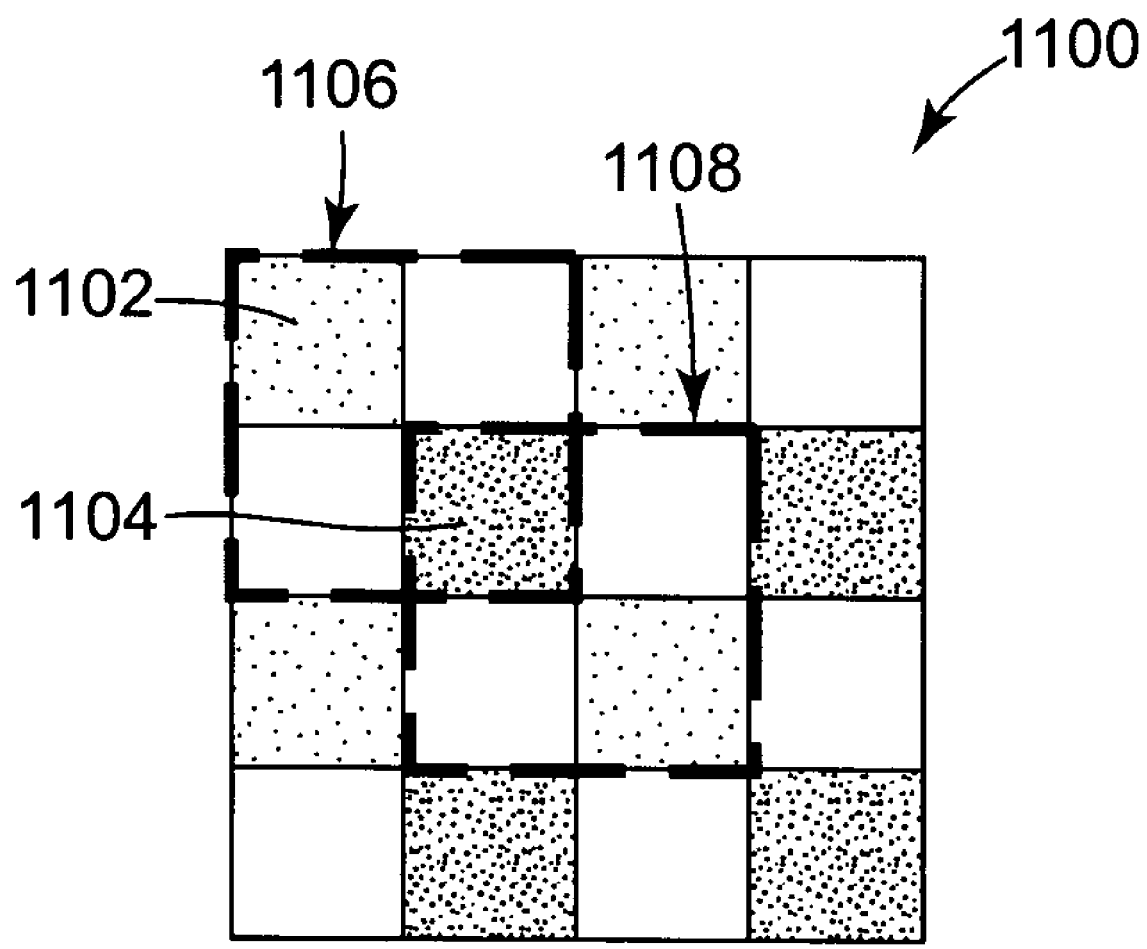
FIG. 14 is a diagram illustrating regions of influence for pixels in an upsampled image according to one embodiment of the present invention.

FIG. 14 is a diagram illustrating regions of influence (Ω) 1106 and 1108 for pixels in an upsampled image 1100 according to one embodiment of the present invention. Pixel 1102 of image 1100 corresponds to a pixel for a first sub-frame, and pixel 1104 of image 1100 corresponds to a pixel for a second sub-frame. Region 1106, which includes a 2×2 array of pixels with pixel 1102 in the upper left corner of the 2×2 array, is the region of influence for pixel 1102. Similarly, region 1108, which includes a 2×2 array of pixels with pixel 1104 in the upper left corner of the 2×2 array, is the region of influence for pixel 1104.

Figure 15:
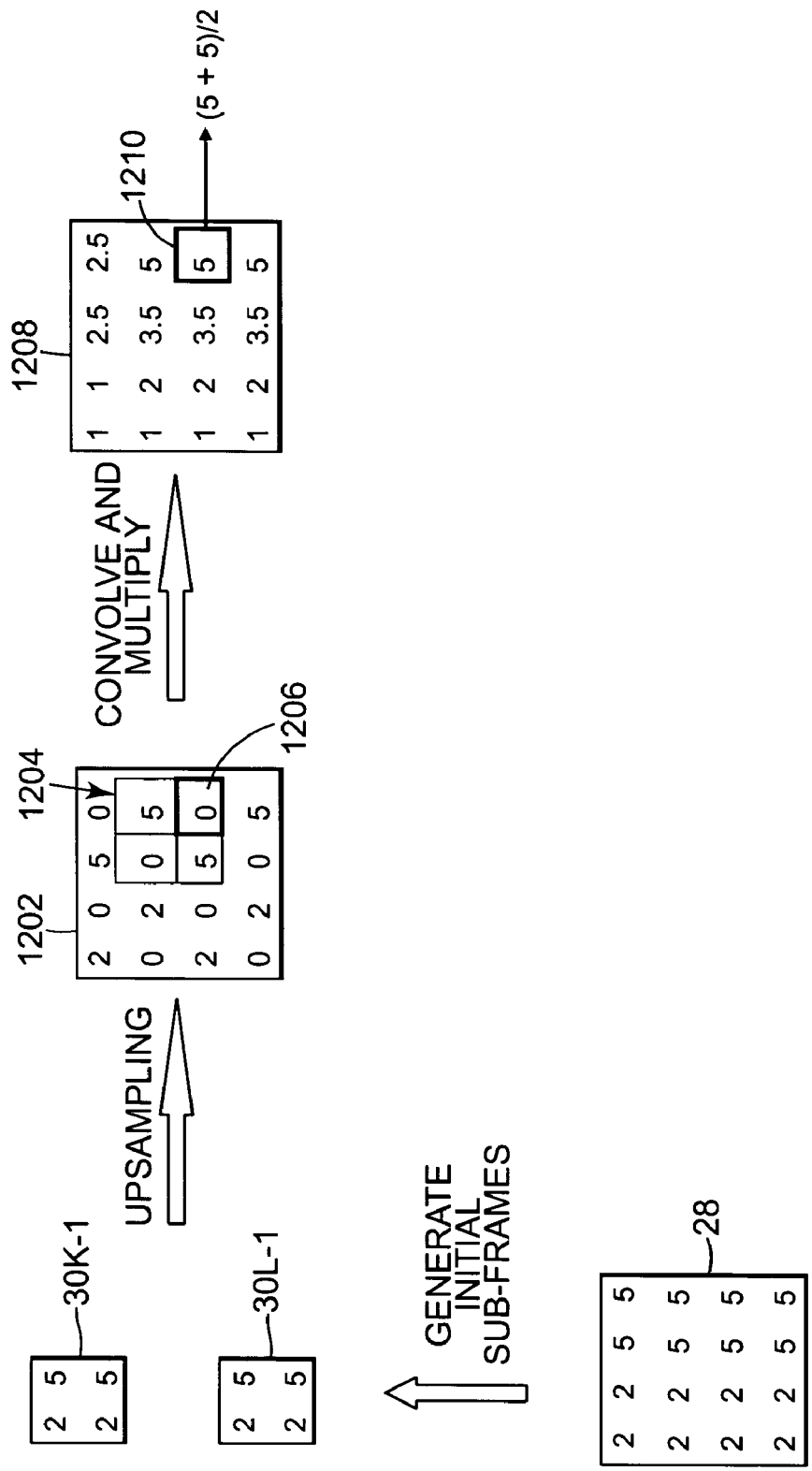
FIG. 15 is a diagram illustrating the generation of an initial simulated high resolution image based on an adaptive multi-pass algorithm according to one embodiment of the present invention.

FIG. 15 is a diagram illustrating the generation of an initial simulated high resolution image 1208 based on an adaptive multi-pass algorithm according to one embodiment of the present invention. An initial set of low resolution sub-frames 30K-1 and 30L-1 are generated based on an original high resolution image 28. In the illustrated embodiment, the initial set of sub-frames 30K-1 and 30L-1 are generated using an embodiment of the nearest neighbor algorithm described above with reference to FIG. 5. The sub-frames 30K-1 and 30L-1 are upsampled to generate upsampled image 1202. The upsampled image 1202 is convolved with an interpolating filter 1204, thereby generating a blocked image, which is then multiplied by a factor of 0.5 to generate simulated high resolution image 1208. In the illustrated embodiment, the interpolating filter 1204 is a 2×2 filter with filter coefficients of "1", and with the center of the convolution being the upper left position in the 2×2 matrix. The lower right pixel 1206 of the interpolating filter 1204 is positioned over each pixel in image 1202 to determine the blocked value for that pixel position. As shown in FIG. 15, the lower right pixel 1206 of the interpolating filter 1204 is positioned over the pixel in the third row and fourth column of image 1202, which has a value of "0". The blocked value for that pixel position is determined by multiplying the filter coefficients by the pixel values within the window of the filter 1204, and adding the results. Out-of-frame values are considered to be "0". For the illustrated embodiment, the blocked value for the pixel in the third row and fourth column of image 1202 is given by the following Equation XXVI (1×0)+(1×5)+(1×5)+(1×0)=10    Equation XXVI The value in Equation XXVI is then multiplied by the factor 0.5, and the result (i.e., 5) is the pixel value for the pixel 1210 in the third row and the fourth column of the initial simulated high resolution image 1208.

Figure 16:
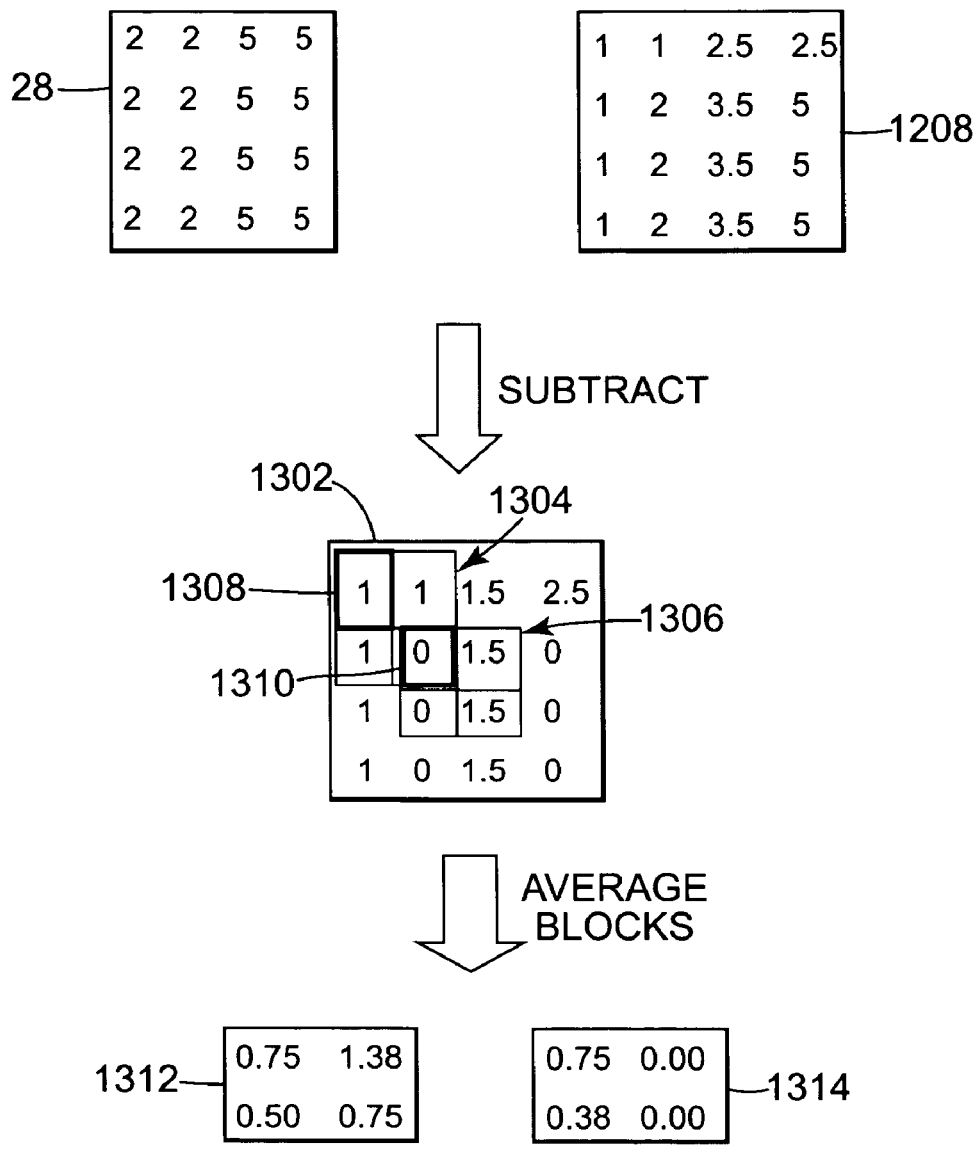
FIG. 16 is a diagram illustrating the generation of correction data based on an adaptive multi-pass algorithm according to one embodiment of the present invention.

After the initial simulated high resolution image 1208 is generated, correction data is generated. FIG. 16 is a diagram illustrating the generation of correction data based on the adaptive multi-pass algorithm according to one embodiment of the present invention. As shown in FIG. 16, the initial simulated high resolution image 1208 is subtracted from the original high resolution image 28 to generate an error image 1302. Correction sub-frames 1312 and 1314 are generated by averaging 2×2 blocks of pixels in error image 1302. For example, the pixel 1308 in the first column and first row of error image 1302 has a region of influence 1304. The pixel values within the region of influence 1304 are averaged to generate a first correction value (i.e., 0.75). The first correction value is used for the pixel in the first column and the first row of correction sub-frame 1312. Similarly, the pixel 1310 in the second column and second row of error image 1302 has a region of influence 1306. The pixel values within the region of influence 1306 are averaged to generate a second correction value (i.e., 0.75). The second correction value is used for the pixel in the first column and the first row of correction sub-frame 1314.

The correction value in the first row and second column of correction sub-frame 1312 (i.e., 1.38) is generated by essentially sliding the illustrated region of influence box 1304 two columns to the right and averaging those four pixels within the box 1304. The correction value in the second row and first column of correction sub-frame 1312 (i.e., 0.50) is generated by essentially sliding the illustrated region of influence box 1304 two rows down and averaging those four pixels within the box 1304. The correction value in the second row and second column of correction sub-frame 1312 (i.e., 0.75) is generated by essentially sliding the illustrated region of influence box 1304 two columns to the right and two rows down and averaging those four pixels within the box 1304.

The correction value in the first row and second column of correction sub-frame 1314 (i.e., 0.00) is generated by essentially sliding the illustrated region of influence box 1306 two columns to the right and averaging those pixels within the box 1306. Out-of-frame values are considered to be "0". The correction value in the second row and first column of correction sub-frame 1314 (i.e., 0.38) is generated by essentially sliding the illustrated region of influence box 1306 two rows down and averaging those pixels within the box 1306. The correction value in the second row and second column of correction sub-frame 1314 (i.e., 0.00) is generated by essentially sliding the illustrated region of influence box 1306 two columns to the right and two rows down and averaging those four pixels within the box 1306.

Figure 17:
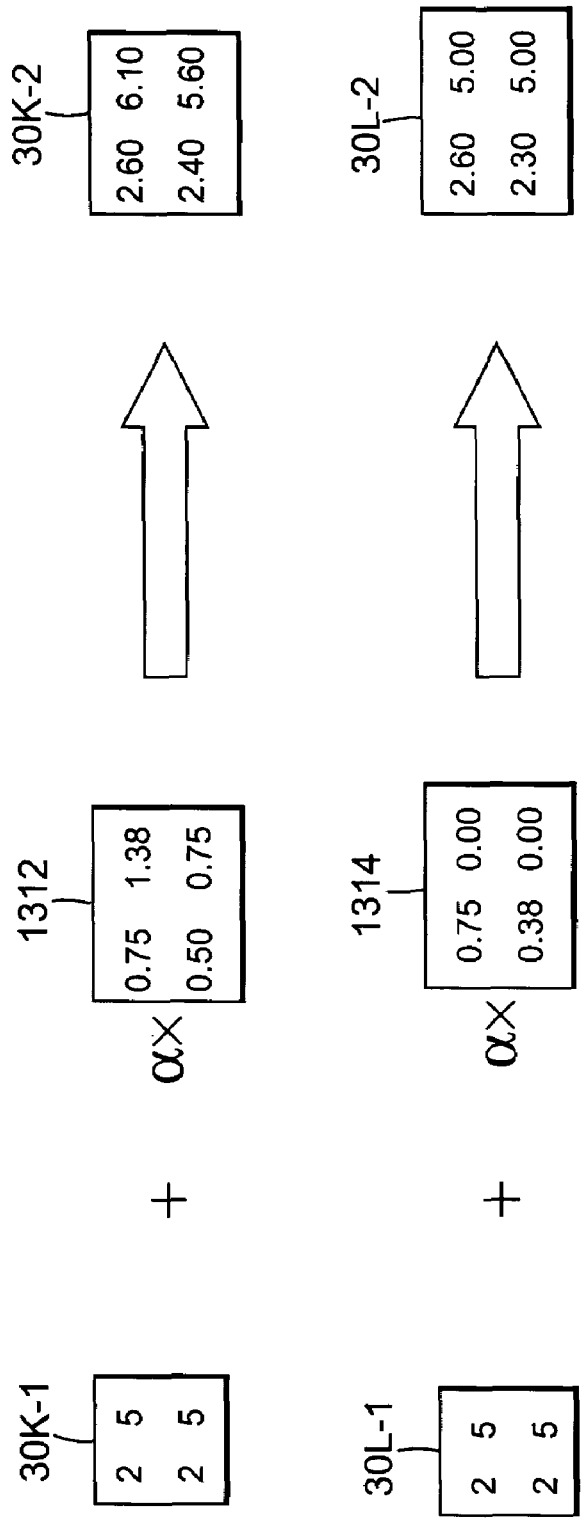
FIG. 17 is a diagram illustrating the generation of updated sub-frames based on an adaptive multi-pass algorithm according to one embodiment of the present invention.

The correction sub-frames 1312 and 1314 are used to generate updated sub-frames. FIG. 17 is a diagram illustrating the generation of updated sub-frames 30K-2 and 30L-2 based on the adaptive multi-pass algorithm according to one embodiment of the present invention. As shown in FIG. 17, the updated sub-frame 30K-2 is generated by multiplying the correction sub-frame 1312 by the sharpening factor, α, and adding the initial sub-frame 30K-1. The updated sub-frame 30L-2 is generated by multiplying the correction sub-frame 1314 by the sharpening factor, α, and adding the initial sub-frame 30L-1. In the illustrated embodiment, the sharpening factor, α, is equal to 0.8.

In one embodiment, updated sub-frames 30K-2 and 30L-2 are used in the next iteration of the adaptive multi-pass algorithm to generate further updated sub-frames. Any desired number of iterations may be performed. After a number of iterations, the values for the sub-frames generated using the adaptive multi-pass algorithm converge to optimal values. In one embodiment, sub-frame generation unit 36 is configured to generate sub-frames 30 based on the adaptive multi-pass algorithm.

The embodiment of the adaptive multi-pass algorithm described above with reference to FIGS. 15-17 is for two-position processing. For four-position processing, Equation XXIV becomes the following Equation XXVII:

$$\frac{\partial J^{(n)}(n)}{\partial l^{(n)}(t)} = 2\left(\sum_k l^{(n)}(k)f(n-k) - h(n)\right)f(n-t)$$ Equation XXVII where:
   $l^{(n)}$=low resolution data for the four sub-frames 30;

And Equation XXIII becomes the following Equation XXVIII:

$$l^{(n+1)}(t) = l^{(n)}(t) + \alpha \frac{\partial J^{(n)}(n)}{\partial l^{(n)}(t)} \quad \text{Equation XXVIII}$$

For four-position processing, there are four sub-frames, so the amount of low resolution data is the same as the amount of high resolution data. Each high resolution grid point contributes one error, and there is no need to average gradient update as represented in Equation XXV above. Rather, the error at a given location directly gives the update.

As described above, in one embodiment, the adaptive multi-pass algorithm uses a least mean squares (LMS) technique to generate correction data. In another embodiment, the adaptive multi-pass algorithm uses a projection on a convex set (POCS) technique to generate correction data. The adaptive multi-pass solution based on the POCS technique according to one embodiment is described in the context of the system 600 shown in FIG. 9. The system 600 shown in FIG. 9 can be represented mathematically in an error cost function by the following Equation XXIX:

$$|e(n)| = \left| \left( \sum_k l_Q(k) f(n-k) - h(n) \right) \right| \quad \text{Equation XXIX}$$

where:
   $e(n)$=error cost function;
   n and k=indices identifying high resolution pixel locations;
   $l_Q(k)$=image data from upsampled image 604 at location k;
   $f(n-k)$=filter coefficient of the interpolating filter at a position n–k; and
   $h(n)$=image data for desired high resolution image 28 at location n.

A constrained set for the POCS technique is defined by the following Equation XXX:

$$C(n) = \left\{ l_Q(n) : \left| \left( \sum_k l_Q(k) f(n-k) - h(n) \right) \right| \leq \eta \right\} \quad \text{Equation XXX}$$

where:
   $C(n)$=constrained set that includes all sub-frame data from upsampled image 604 that is bounded by parameter, $\eta$; and
   $\eta$=error magnitude bound constraint.

The sub-frame pixel values for the current iteration are determined based on the following Equation XXXI:

$$l_Q^{(n+1)}(t) = \begin{cases} (1-\lambda) l_Q^{(n)}(t) + \lambda \frac{e(n^*) - \eta}{\|f\|^2} & e(n^*) > \eta \quad (t \in \Theta) \\ (1-\lambda) l_Q^{(n)}(t) + \lambda \frac{e(n^*) + \eta}{\|f\|^2} & e(n^*) < \eta \\ l_Q^{(n)}(t) & e(n^*) = \eta \end{cases} \quad \text{Equation XXXI}$$

where:
   n=index identifying the current iteration;
   $\lambda$=relaxation parameter; and
   $\|f\|$=norm of the coefficients of the interpolating filter.

The symbol, n*, in Equation XXXI represents the location in the region of influence, $\Omega$, where the error is a maximum, and is defined by the following Equation XXXII:

$$n^* = \arg\max\{n \in \Omega : |e(n)|\} \quad \text{Equation XXXII}$$

Figure 18:
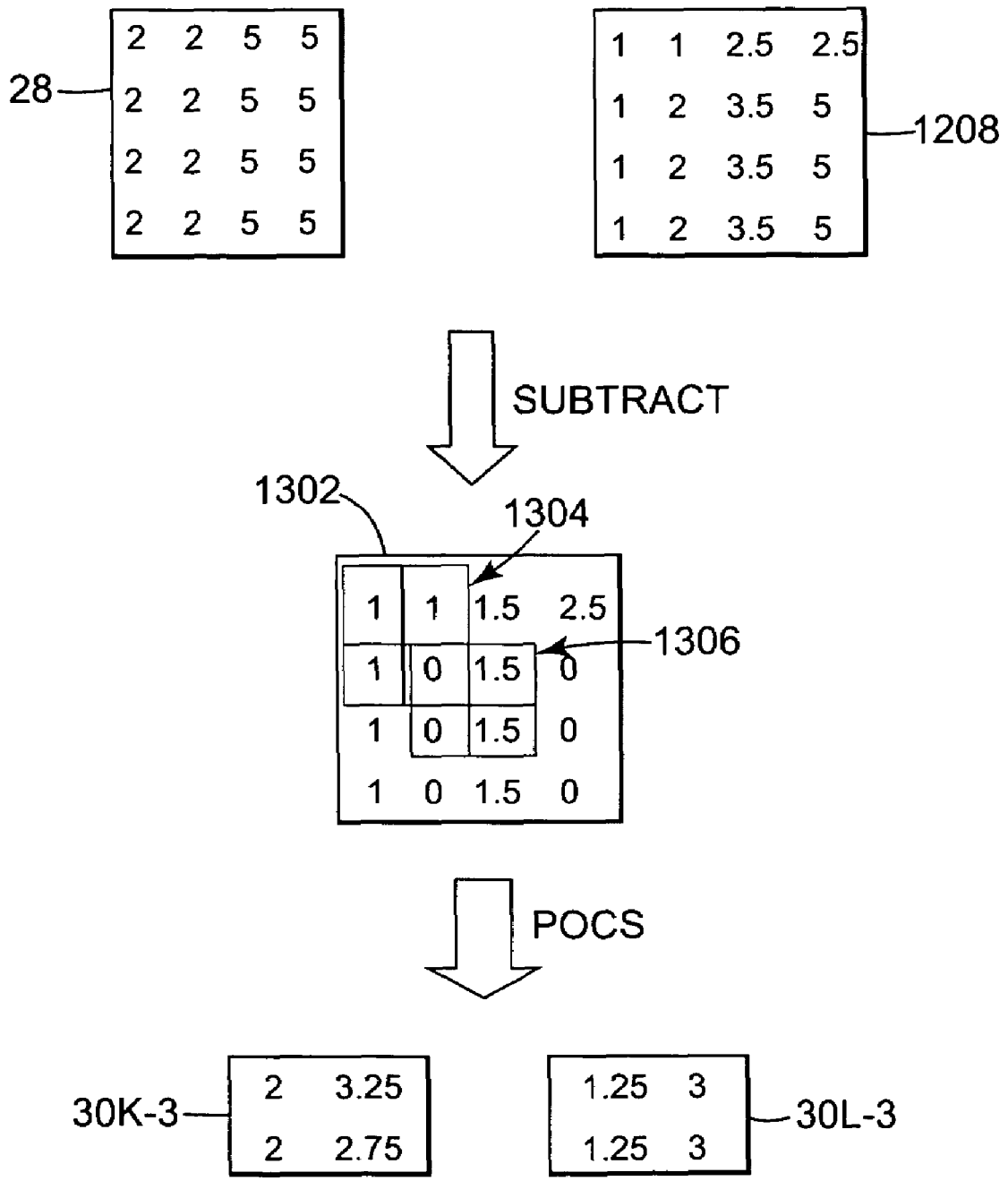
FIG. 18 is a diagram illustrating the generation of correction data based on an adaptive multi-pass algorithm according to another embodiment of the present invention.

FIG. 18 is a diagram illustrating the generation of correction data based on the adaptive multi-pass algorithm using a POCS technique according to one embodiment of the present invention. In one embodiment, an initial simulated high resolution image 1208 is generated in the same manner as described above with reference to FIG. 15, and the initial simulated high resolution image 1208 is subtracted from the original high resolution image 28 to generate an error image 1302. The Equation XXXI above is then used to generate updated sub-frames 30K-3 and 30L-3 from the data in error image 1302. For the illustrated embodiment, it is assumed that relaxation parameter, $\lambda$, in Equation XXXI is equal to 0.5, and the error magnitude bound constraint, $\eta$, is equal to 1.

With the POCS technique, rather than averaging the pixel values within the region of influence to determine a correction value as described above with reference to FIG. 16, the maximum error, e(n*), within the region of influence is identified. An updated pixel value is then generated using the appropriate formula from Equation XXXI, which will depend on whether the maximum error, e(n*), within the region of influence is greater than 1, less than 1, or equal to 1 (since $\eta$=1 for this example).

For example, the pixel in the first column and first row of error image 1302 has a region of influence 1304. The maximum error within this region of influence 1304 is 1 (i.e., e(n*)=1). Referring to Equation XXXI, for the case where e(n*)=1, the updated pixel value is equal to the previous value for this pixel. Referring to FIG. 15, the previous value for the pixel in the first column and the first row of sub-frame 30K-1 was 2, so this pixel remains with a value of 2 in updated sub-frame 30K-3. The pixel in the second column and second row of error image 1302 has a region of influence 1306. The maximum error within this region of influence 1306 is 1.5 (i.e., e(n*)=1.5). Referring to Equation XXXI, for the case where e(n*)>1, the updated pixel value is equal to half the previous value for this pixel, plus half of the quantity (e(n*)–1), which is equal to 1.25. Referring to FIG. 15, the previous value for the pixel in the first column and the first row of sub-frame 30L-1 was 2, so the updated value for this pixel is 1.25 in updated sub-frame 30L-3.

The region of influence boxes 1302 and 1304 are essentially moved around the error image 1302 in the same manner as described above with reference to FIG. 16 to generate the remaining updated values in updated sub-frames 30K-3 and 30L-3 based on Equation XXXI.

IX. Noise Reduction and Resolution Enhancement Using Gradients

Image data 16 may be received by image display system 10 using a relatively noisy source signal thereby causing image frame 28 to include noise. In generating sub-frames 30 from image frame 28, any noise from image data 16 may be reflected in the process of minimizing the error between a simulated image and image frame 28. As a result, sub-frames 30 may also include the noise.

In effort to minimize any noise in sub-frames 30, image processing unit 24 adjusts a value of the sharpening factor, $\alpha$, (shown above in Equation XXV) for each sub-frame pixel value in sub-frames 30 in the process of minimizing the error during the generation of sub-frames 30. Image processing unit 24 adjusts the value of the sharpening factor using an average of a set of a multi-scale gradients in a region of influence for each sub-frame pixel value. Image processing unit 24 calculates the multi-scale gradients by detecting edges in an image frame 28 across multiple scales using a multi-scale gradient estimator and correlating the gradient estimations across scales to generate the multi-scale gradients. Image processing unit 24 adjusts the sharpening factor for each sub-frame pixel value in sub-frames 30 based on the multi-scale gradients. By adjusting the value of the sharpening factor, noisy regions of image frame 28 may be smoothed in generating sub-frames 30. In addition, edge regions, also referred to as high contrast regions, of image frame 28 may be sharpened in generating sub-frames 30.

As noted above, a block-LMS algorithm using the average gradient over a region of influence is used to perform the update, as represented by Equation XXV. In taking into account the impact of noise in generating sub-frames 30, the value for the derivative of Equation XXV includes the term h(n), which represents the noise-free image, and a term ψ(n), which represents the noise as shown in Equation XXXIII.

$$\frac{\partial J}{\partial l_Q^{(n)}(t)} = 2 \sum_n \left( \sum_k l_Q^{(n)}(k) f(n-k) - h(n) - \psi(n) \right) f(n-t) \qquad \text{Equation XXXIII}$$

Accordingly, the impact of the noise in the block-LMS algorithm of Equation XXV may be represented in the error term using the term $\Delta_{noise}$ as shown in Equation XXXIV.

$$l_Q^{(n+1)}(t) = l_Q^{(n)}(t) + \alpha \left( \Delta_{noise\text{-}free} + \Delta_{noise} \right) \qquad \text{Equation XXXIV}$$

Using Equation XXXIV, image processing unit 24 smoothes noise reflected in the error minimization process by adjusting the sharpening factor, α, to a relatively low value for noisy regions of a sub-frame 30. Image processing unit 24 also sharpens or enhances edge regions of a sub-frame 30 by adjusting the sharpening factor, α, to a relatively high value. In regions of sub-frame 30 that are not noisy and do not include an edge, image processing unit 24 adjusts the sharpening factor, α, to a relatively moderate value. By adjusting the sharpening factor, α, image processing system may effectively reduce noise and enhance resolution in generating sub-frames 30.

Figure 19:
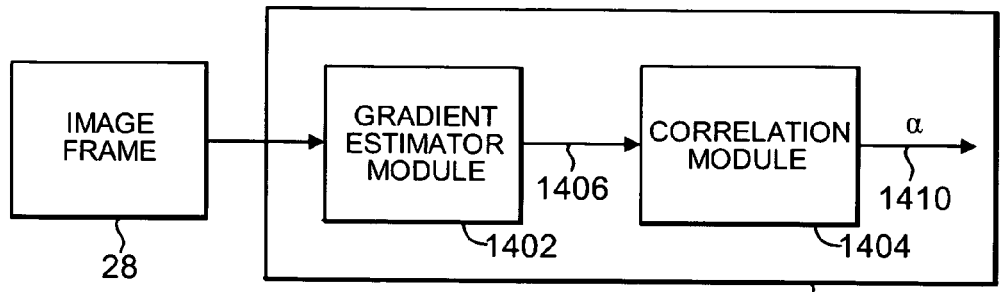
FIG. 19 is a block diagram illustrating the generation of sub-frames with noise reduction and resolution enhancement according to one embodiment of the present invention.

FIG. 19 is a block diagram illustrating the generation of sub-frames 30 with noise reduction and resolution enhancement. In FIG. 19, image processing unit 24 includes a gradient estimator module 1402 and a correlation module 1404. Gradient estimator module 1402 and correlation module 1404 each include software, hardware, firmware, or a combination of these and may be included as part of a computer, computer server, or other processor-based system capable of performing a sequence of logic operations or executing software or firmware instructions.

Figure 20A:
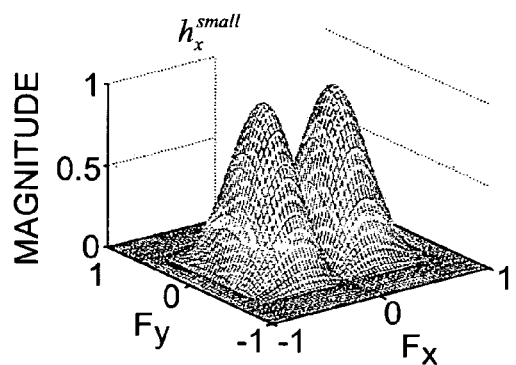
FIGS. 20A-20B are graphs illustrating filters uses to estimate gradients.
Figure 20B:
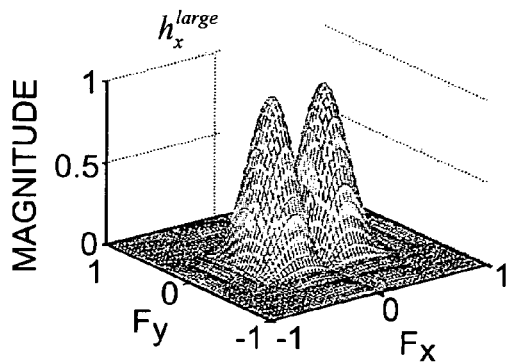

Gradient estimator module 1402 estimates gradients at multiple scales for sets of pixel values in an image frame 28. In one embodiment, gradient estimator module 1402 includes filters configured to estimate gradients in the x and y directions using different scales. The filters, $h_x^{small}$ and $h_y^{small}$, estimate gradients in the x and y directions, respectively, using a relatively small scale, e.g., 1/1024. The filters, $h_x^{large}$ and $h_y^{large}$, estimate gradients in the x and y directions, respectively, using a relatively large scale, e.g., 1/2048, for each direction. The graphs shown in FIGS. 20A and 20B illustrate example magnitude responses of the filters $h_x^{small}$ and $h_x^{large}$, respectively. The filters $h_x^{small}$, $h_y^{small}$, $h_x^{large}$, and $h_y^{large}$ produce the gradient estimates $e_x^{small}$, $e_y^{small}$, $e_x^{large}$, and $e_y^{large}$ respectively, for each set of sub-frame pixel values from sub-frame frame 30. Gradient estimator module 1402 provides the gradient estimates from each filter for each set of sub-frame pixel values from sub-frame 30 to correlation module 1404.

Correlation module 1404 correlates the gradient estimates across the scales to generate a multi-scale gradient estimate for each set of pixel values from image frame 28. To correlate the gradient estimates across the scales, correlation module 1404 calculates effective gradient estimates for the x and y directions using Equation XXXV and Equation XXXVI, respectively.

$$e_x^{eff}(n) = |e_x^{small}(n) \times e_x^{large}(n) \times e_x^{large}(n)|^{1/3} \qquad \text{Equation XXXV}$$

$$e_y^{eff}(n) = |e_y^{small}(n) \times e_y^{large}(n) \times e_y^{large}(n)|^{1/3} \qquad \text{Equation XXXVI}$$

In Equation XXXV and Equation XXXVI, the large-scale gradients are weighted more heavily than the small scale gradients in an effort to suppress small-scale noise.

Using the effective gradient estimates for the x and y directions from Equation XXXV and Equation XXXVI, correlation module 1404 calculates a multi-scale gradient, $e^{eff}(n)$, using Equation XXXVII.

$$e^{eff}(n) = \sqrt{\left(e_x^{eff}(n)\right)^2 + \left(e_y^{eff}(n)\right)^2} \qquad \text{Equation XXXVII}$$

Using the multi-scale gradients from Equation XXXVII, correlation module 1404 calculates a sharpening factor for each sub-frame pixel value of sub-frames 30 by averaging the multi-scale gradients in the respective regions of influence of the sub-frame pixel values using Equation XXXVIII and Equation XXXIX.

$$\alpha'(t) = -\beta_1 + \beta_2 \frac{\sum_{n \in \Omega} e^{eff}(n-t)}{|\Omega|} \qquad \text{Equation XXXVIII}$$

where:

$\beta_1$ and $\beta_2$=parameter settings;

$\Omega$=region of influence.

$$\alpha(t) = \begin{cases} \alpha'(t) & \alpha_{min} < \alpha'(t) < \alpha_{max} \\ \alpha_{min} & \alpha_{min} > \alpha'(t) \\ \alpha_{max} & \alpha'(t) > \alpha_{max} \end{cases} \qquad \text{Equation XXXIX}$$

where:

$\alpha_{min}$ and $\alpha_{max}$=minimum and maximum sharpening factor values.

In one embodiment, $\beta_1$ is 0.75, $\beta_2$ is 0.2, $\alpha_{min}$ is −0.5, and $\alpha_{max}$=2.0. In other embodiments, other parameter setting and minimum and maximum sharpening factor values may be used. In particular, the parameter setting and minimum and maximum sharpening factor values may be tuned to a particular display device 26.

Figure 21:
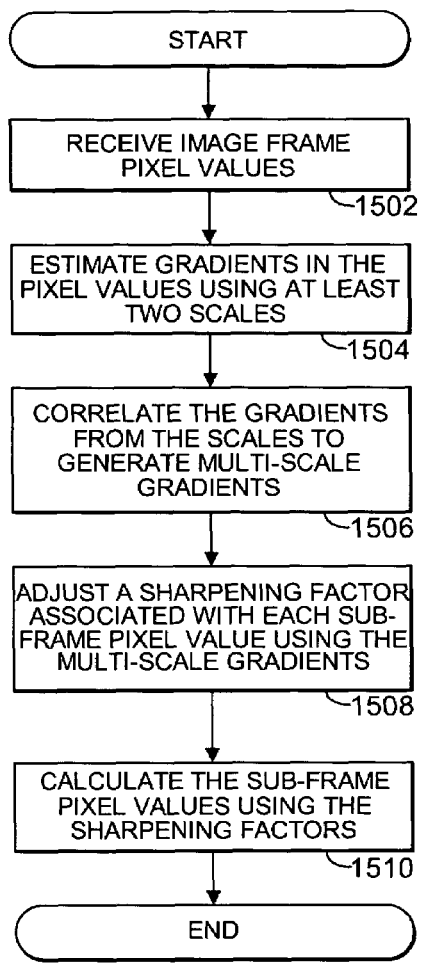
FIG. 21 is a flow chart illustrating a method for generating sub-frames with noise reduction and resolution enhancement according to one embodiment of the present invention.

FIG. 21 is a flow chart illustrating a method for generating sub-frames with noise reduction and resolution enhancement using an adaptive multi-pass algorithm. In FIG. 21, image processing unit 24 receives pixel values from an image frame 28 as indicated in a block 1502. Image processing unit 24 estimates gradients in the pixel values using at least two scales as indicated in a block 1504. Image processing unit 24 correlates the gradients from the scales to generate multi-scale gradients as indicated in a block 1506. Image processing unit 24 adjusts a sharpening factor associated with each sub-frame pixel value from sub-frames 30 using the multi-scale gradients as indicated in a block 1508. Image processing unit 24 calculates the sub-frame pixel values using the sharpening factors as indicated in a block 1510.

Figure 22:
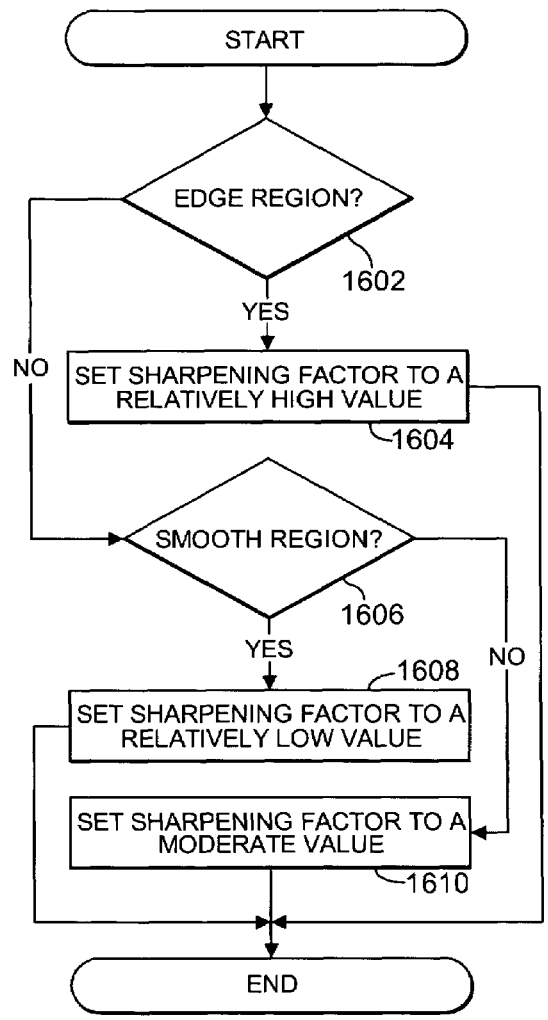
FIG. 22 is a flow chart illustrating a method for generating sub-frames by adjusting a sharpening factor according to one embodiment of the present invention.

FIG. 22 is a flow chart illustrating a method for generating sub-frames by adjusting a sharpening factor used in calculating a sub-frame pixel value. In FIG. 22, a determination is made by image processing unit 24 as to whether the set of pixel values in an image frame 28 is associated with an edge region of the initial sub-frame as indicated in a block 1602. If the set of pixel values is associated with an edge region, then image processing unit 24 sets a sharpening factor for a corresponding sub-frame pixel value in sub-frames 30 to a relatively high value as indicated in a block 1604. If the set of pixel values is not associated with an edge region, then a determination is made by image processing unit 24 as to whether the set of pixel values is associated with a smooth region as indicated in a block 1606. If the set of pixel values is associated with a smooth region, then image processing unit 24 sets a sharpening factor for the corresponding sub-frame pixel value in sub-frames 30 to a relatively low value as indicated in a block 1608. If the set of pixel values is not associated with a smooth region, then image processing unit 24 sets a sharpening factor for the corresponding sub-frame pixel value in sub-frames 30 to a relatively moderate value as indicated in a block 1610.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of displaying an image with a display device, the method comprising:
   determining first and second pluralities of gradients from image data for the image, wherein the first and the second pluralities of gradients correspond to first and second regions of influence, respectively, of first and second pixel values of a first sub-frame, respectively;
   generating the first sub-frame and a second sub-frame from the image data, wherein generating the first sub-frame includes calculating the first sub-frame pixel value in the first sub-frame using a first sharpening factor determined from the first plurality of gradients and calculating the second sub-frame pixel value in the first sub-frame using a second sharpening factor determined from the second plurality of gradients, and wherein the first sharpening factor differs from the second sharpening factor; and
   alternating between displaying the first sub-frame in a first position and displaying the second sub-frame in a second position spatially offset from the first position;
   wherein generating the first sub-frame includes calculating the first sub-frame pixel value in the first sub-frame by applying the first sharpening factor to an error term, and wherein generating the first sub-frame includes calculating the second sub-frame pixel value in the first sub-frame by applying the second sharpening factor to the error term.

2. The method of claim 1 wherein each of the first plurality of gradients and each of the second plurality of gradients comprises a multi-scale gradient.

3. The method of claim 2 further comprising:
   generating the first sharpening factor using a first average of the first plurality of gradients; and
   generating the second sharpening factor using a second average of the second plurality of gradients.

4. The method of claim 1 wherein the error term comprises a difference between the image data and a simulated image.

5. The method of claim 1 wherein the first sharpening factor is configured to sharpen a first area of the first sub-frame that includes the first sub-frame pixel value, and wherein the second sharpening factor is configured to sharpen a second area of the first sub-frame that includes the second sub-frame pixel value.

6. The method of claim 5 wherein the first sharpening factor is configured to sharpen the first area of the first sub-frame that includes the first sub-frame pixel value in response to the first plurality of gradients being associated with a first edge region, and wherein the second sharpening factor is configured to sharpen the second area of the first sub-frame that includes the second sub-frame pixel value in response to the second plurality of gradients being associated with a second edge region.

7. The method of claim 1 wherein the first sharpening factor is configured to smooth a first area of the first sub-frame that includes the first sub-frame pixel value, and wherein the second sharpening factor is configured to smooth a second area of the first sub-frame that includes the second sub-frame pixel value.

8. The method of claim 7 wherein the first sharpening factor is configured to smooth the first area of the first sub-frame that includes the first sub-frame pixel value in response to the first plurality of gradients being associated with a first smooth region, and wherein the second sharpening factor is configured to sharpen the second area of the first sub-frame that includes the second sub-frame pixel value in response to the second plurality of gradients being associated with a second smooth region.

9. The method of claim 1 further comprising:
   determining third and fourth pluralities of gradients from the image data, wherein the third and the fourth pluralities of gradients correspond to third and fourth regions of influence, respectively, of first and second pixel values of the second sub-frame, respectively;
   wherein generating the second sub-frame includes calculating the first sub-frame pixel value in the second sub-frame using a third sharpening factor determined from the third plurality of gradients and calculating the second sub-frame pixel value in the second sub-frame using a fourth sharpening factor determined from the fourth plurality of gradients, and wherein the third sharpening factor differs from the fourth sharpening factor.

10. The method of claim 1 further comprising:
generating a third sub-frame and a fourth sub-frame corresponding to the image data; and
wherein alternating between displaying the first sub-frame and displaying the second sub-frame further includes alternating between displaying the first sub-frame in the first position, displaying the second sub-frame in the second position, displaying the third sub-frame in a third position spatially offset from the first position and the second position, and displaying the fourth sub-frame in a fourth position spatially offset from the first position, the second position, and the third position.

11. A system for displaying an image, the system comprising:
an image processing unit configured to generate first and second sub-frames corresponding to image data for the image by applying first and second sharpening factors determined from first and second pluralities of gradients, respectively, to an error term for first and second sub-frame pixel values in the first sub-frame and applying third and fourth sharpening factors determined from third and fourth pluralities of gradients, respectively, of third and fourth regions of interest of the image data, respectively, to the error term for third and fourth sub-frame pixel values in the second sub-frame; and
a display device adapted to alternately display the first sub-frame in a first position and the second sub-frame in a second position spatially offset from the first position.

12. The system of claim 11 wherein the error term indicates a difference between the image data and a simulated image.

13. The system of claim 11 wherein the image processing unit is configured to generate each of the first, the second, the third, and the fourth pluralities of gradients using respective first, second, third, and fourth pluralities of gradient estimates each from a plurality of scales.

14. The system of claim 11 wherein the image processing unit is configured to generate the first and the second sharpening factors using the first and the second pluralities of gradients, respectively.

15. The system of claim 11, wherein the image processing unit is configured to generate a third sub-frame and a fourth sub-frame corresponding to the image data; and
wherein the display device is configured to alternate between displaying the first sub-frame in the first position, displaying the second sub-frame in the second position, displaying the third sub-frame in a third position spatially offset from the first position and the second position, and displaying the fourth sub-frame in a fourth position spatially offset from the first position, the second position, and the third position.

16. A system for generating first and second sub-frames for display at spatially offset positions to generate the appearance of an image, the system comprising:
means for calculating first and second pluralities of gradients using a plurality of scales for first and second regions of influence, respectively, of first and second sub-frame pixel values, respectively, from the first sub-frame;
means for calculating first and second sharpening factors using the first and the second pluralities of gradients, respectively; and
means for calculating the first sub-frame pixel value by applying the first sharpening factor to an error term and the second sub-frame pixel value by applying the second sharpening factor to the error term.

17. The system of claim 16 further comprising:
means for calculating third and fourth pluralities of gradients using the plurality of scales for third and fourth regions of influence, respectively, of third and fourth sub-frame pixel values, respectively, from the second sub-frame;
means for calculating third and fourth sharpening factors using the third and the fourth pluralities of gradients, respectively; and
means for calculating the third sub-frame pixel value using the third sharpening factor and the fourth sub-frame pixel value using the fourth sharpening factor.

18. A computer-readable medium storing computer-executable instructions, which, when executed by a computer processing system, cause the system to perform a method of generating first and second sub-frames from an image frame for display at spatially offset positions to generate the appearance of an image, comprising:
setting a first sharpening factor to a relatively low value in response to detecting a first smooth region in the image frame associated with a first region of influence of a first sub-frame pixel value of the first sub-frame;
setting the first sharpening factor to a relatively high value in response to detecting a first edge region in the image frame associated with the first region of influence of the first sub-frame pixel value of the first sub-frame;
setting the first sharpening factor to a moderate value in response to not detecting the first smooth region or the first edge region in the image frame associated with the first region of influence of the first sub-frame pixel value of the first sub-frame;
setting a second sharpening factor to the relatively low value in response to detecting a second smooth region in the image frame associated with a second region of influence of a second sub-frame pixel value of the first sub-frame;
setting the second sharpening factor to the relatively high value in response to detecting a second edge region in the image frame associated with the second region of influence of the second sub-frame pixel value of the first sub-frame;
setting the second sharpening factor to the moderate value in response to not detecting the second smooth region or the second edge region in the image frame associated with the second region of interest of the second sub-frame pixel value of the first sub-frame;
calculating the first sub-frame pixel value using the first sharpening factor and an error term; and
calculating the second sub-frame pixel value using the second sharpening factor and the error term.

19. The computer-readable medium of claim 18 storing computer-executable instructions, which, when executed by the computer processing system, cause the system to for perform the method further comprising:
setting a third sharpening factor to the relatively low value in response to detecting a third smooth region in the image frame associated with a third region of influence of a third sub-frame pixel value of the second sub-frame;
setting the third sharpening factor to the relatively high value in response to detecting a third edge region in the image frame associated with the third region of influence of the third sub-frame pixel value of the second sub-frame; and
setting the third sharpening factor to the moderate value in response to not detecting the third smooth region or the third edge region in the image frame associated with the third region of influence of the third sub-frame pixel value of the second sub-frame.

20. The computer-readable medium of claim 19 storing computer-executable instructions, which, when executed by the computer processing system, cause the system to for perform the method further comprising:

calculating the third sub-frame pixel value using the third sharpening factor.

* * * * *